(12) United States Patent
Hamamoto

(10) Patent No.: US 9,563,020 B2
(45) Date of Patent: Feb. 7, 2017

(54) INTER-MODE LIGHT SWITCH

(71) Applicant: Kyushu University, National University Corporation, Fukuoka (JP)

(72) Inventor: Kiichi Hamamoto, Fukuoka (JP)

(73) Assignee: KYUSHU UNIVERSITY, NATIONAL UNIVERSITY CORPORATION (JP)

( * ) Notice: Subject to any disclaimer, the term of this patent is extended or adjusted under 35 U.S.C. 154(b) by 0 days.

(21) Appl. No.: 14/634,197

(22) Filed: Feb. 27, 2015

(65) Prior Publication Data

US 2015/0168652 A1    Jun. 18, 2015

Related U.S. Application Data

(63) Continuation of application No. PCT/JP2013/072848, filed on Aug. 27, 2013.

(30) Foreign Application Priority Data

Aug. 27, 2012  (JP) .................... 2012-186852

(51) Int. Cl.
| | |
|---|---|
| G02B 6/26 | (2006.01) |
| G02B 6/42 | (2006.01) |
| G02B 6/35 | (2006.01) |
| G02F 1/035 | (2006.01) |
| G02F 1/313 | (2006.01) |
| G02F 1/21 | (2006.01) |

(52) U.S. Cl.
CPC ............ *G02B 6/354* (2013.01); *G02F 1/0353* (2013.01); *G02F 1/3133* (2013.01); *G02F 1/3136* (2013.01); *G02F 2001/212* (2013.01); *G02F 2201/05* (2013.01)

(58) Field of Classification Search
CPC ...... G02B 6/354; G02F 1/0353; G02F 1/3133; G02F 1/3136
USPC ............................................ 385/16
See application file for complete search history.

(56) References Cited

U.S. PATENT DOCUMENTS

| | | |
|---|---|---|
| 4,070,094 A | 1/1978 | Martin |
| 6,853,773 B2 * | 2/2005 | Lin .................... G02B 6/12011 |
| | | 385/1 |

FOREIGN PATENT DOCUMENTS

| | | |
|---|---|---|
| JP | 50-20744 A | 3/1975 |
| JP | 63-223711 | 9/1988 |

(Continued)

OTHER PUBLICATIONS

Nicolas Riesen and John D. Love, Design of Mode-Sorting Asymmetric Y-Junctions, Applied Optics; vol. 51, No. 15; May 20, 2012.

(Continued)

*Primary Examiner* — Jerry Blevins
(74) *Attorney, Agent, or Firm* — Duquette Law Group, LLC

(57) ABSTRACT

Provided is an optical mode switch that can effect a more compact optical switch. The optical mode switch (100) is provided with: a single input port (1); a single output port (2); two waveguides (10) provided in parallel between the input port (1) and the output port (2); and a refractive index altering means (8) that alters the refractive index of the waveguides. Any given mode light input to the input port (1) is output as any given mode light from the output port (2) in accordance with the refractive index altered by the refractive index altering means (8).

12 Claims, 18 Drawing Sheets

(56) References Cited

FOREIGN PATENT DOCUMENTS

| JP | 01-222216 | 9/1989 | | |
|----|-----------|--------|---|---|
| JP | 2000221345 | 8/2000 | | |
| JP | 2002072157 | 3/2002 | | |
| JP | 2005300570 | 10/2005 | | |
| JP | 2006030860 A * | 2/2006 | ............... | G02B 6/12 |
| WO | 03100485 A3 | 12/2003 | | |

OTHER PUBLICATIONS

Joris Van Campenhout, William M. J. Green, Solomon Assefa, Andyurii A. Vlasov, Low-Power, 2×2 Silicon Electro-Optic Switch With 110-NM Bandwidth for Broadband Reconfigurable Optical Networks, Optics Express; vol. 17, No. 26; Dec. 21, 2009.

International Search Report Dated Oct. 1, 2013 From Corresponding International Application No. PCT/JP2013/072848.

Andy L. Y. Low,et al.; A Five-Order Mode Converter for Multimode Waveguide; IEEE Photonics Technology Letters,vol. 16, No. 7, Jul. 2004. pp. 1673-1675.

E. Narevicius, et al. Controlled Mode Interaction Based Wide-Band and Robust Optical Switching Unit in Silica-on-Silicon, 2005 Conference on Lasers & Electro-Optics (CLEO); vol. 2, May 22, 2016, pp. 1037-1039.

Steven J. Spector, et al. Operation and Optimization of Silicon-Diode-Based Optical Modulators; IEEE Journal of Selected Topics in Quantum Electronics, vol. 16; No. 1, Jan. / Feb. 2010. pp. 165-172.

European Search Report dated Apr. 19, 2016 from corresponding European Application No. EP 13833826.4.

* cited by examiner

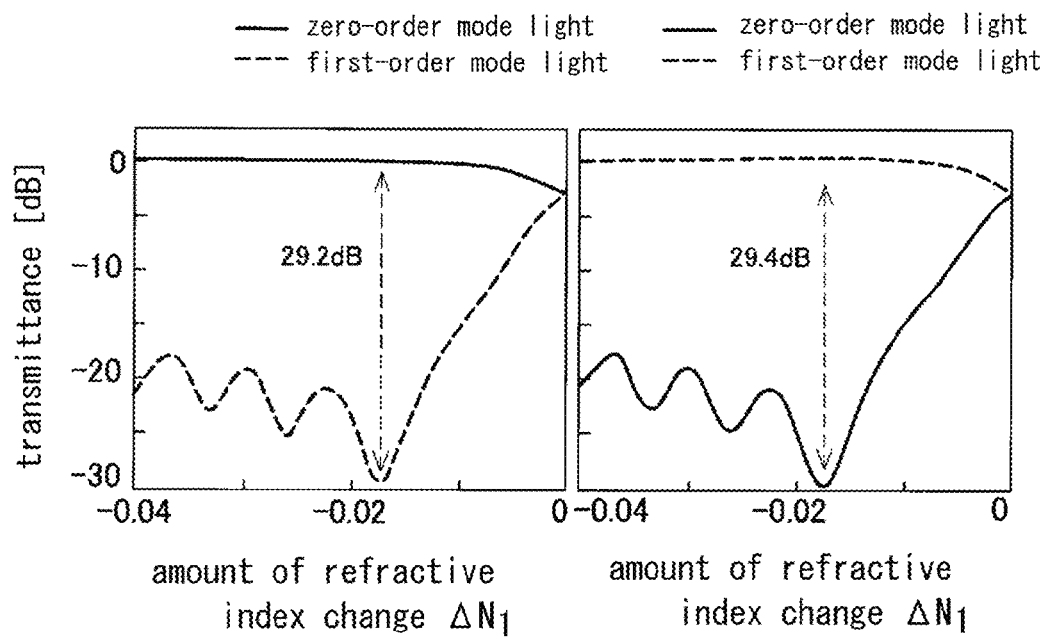
FIG. 9(a)
FIG. 9(c)
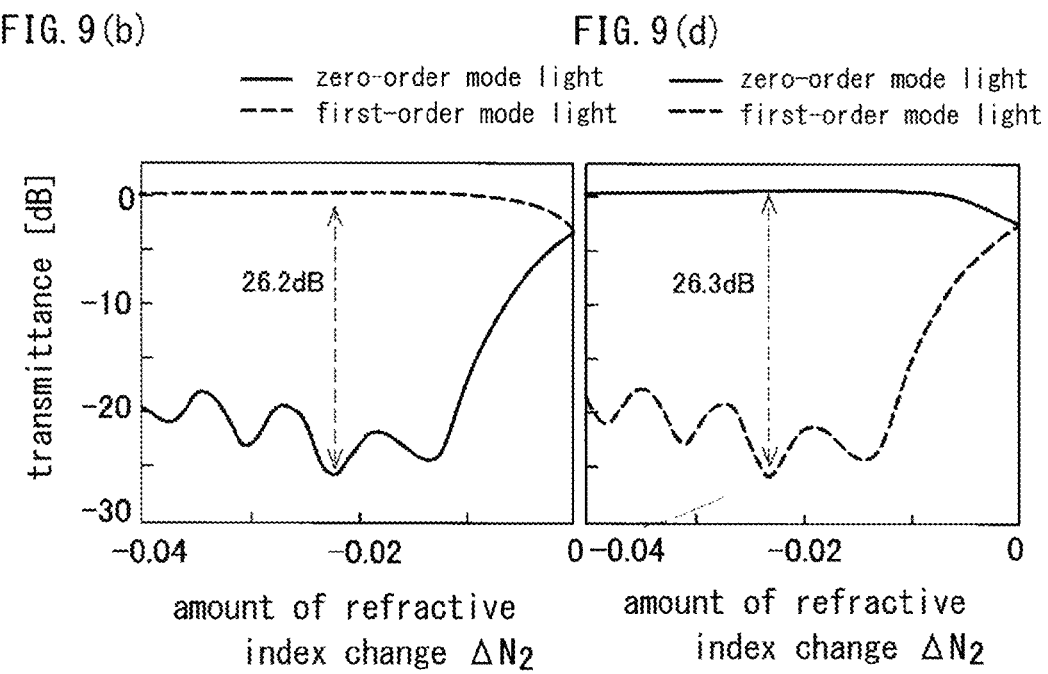
FIG. 9(b)
FIG. 9(d)

Propagation direction [μm]

INTER-MODE LIGHT SWITCH

RELATED APPLICATIONS

This patent application a continuation of International Application No. PCT/JP2013/072848, filed on Aug. 27, 2013, now pending, which claims priority to Japanese Application No. 2012-186852, filed Aug. 27, 2012, the contents and teachings of each of which are hereby incorporated by reference in their entirety.

TECHNICAL FIELD

The present invention relates to an optical mode switch that switches arbitrary mode light into arbitrary mode light.

BACKGROUND

Conventional spatial optical switch is comprised of: an input waveguide that inputs an optical signal; a slab waveguide that distributes the optical signal to an arrayed waveguide; an arrayed waveguide that is equipped with a triangular-shaped electrode for performing current injection or voltage application in order to change refractive index; a slab waveguide that couples outputted light from the arrayed waveguide to an output waveguide; and a plurality of output waveguides that output optical signals (see Patent Literature 1: Japanese Patent Application Laid-Open No. 2002-72157, for example). This conventional spatial optical switch has a plurality of output waveguides arranged in parallel, which spatially distribute an input optical signal of one wavelength by a control signal to be applied to an electrode, and couples a signal of one wavelength to different output waveguides.

SUMMARY

Technical Problem

In the conventional spatial optical switch, each output waveguide of the plurality of output waveguides is optically connected to one optical fiber and, therefore, it is necessary to widen the distance between adjacent output waveguides, depending on the diameter of the optical fiber (the pitch between adjacent optical fibers). As a result, there is a problem that the spatial optical switch cannot be downsized, and the number of output waveguides is limited and large-scale integration cannot be realized.

In contrast, on the background of a recent increase in information traffic, mode multiplexing transmission technology has attracted attention as one of future means for enhancing the capacity. Using this mode multiplexing transmission technology, an optical switch, when spatial position information is switched to mode information by mode switch devices connected before and after the optical switch, functions as a switch for switching the mode. Therefore, it is sufficient to arrange single waveguide for the input port as well as output port of the device.

Thus, an optical switch that switches arbitrary mode light into arbitrary mode light (optical mode switch) can be expected to be applied to mode multiplexing transmission, as well as applied to a future high-integrated spatial optical switch, such as the reduction of the number of optical components to be coupled with the end of the optical switch (input waveguide, output waveguide), by associating the mode information with the spatial position information. However, the optical mode switch is in a developmental stage and does not exist as a product at present.

This invention has been made to solve the above problems and to provide an optical mode switch that can reduce the size of an optical switch.

Solution to Problem

An optical mode switch according to the present invention includes: a single input port; a single output port; and mode switch means arranged between the input port and the output port, and the mode switch means outputs arbitrary mode light inputted from the input port, from the output port, as arbitrary mode light.

Advantageous Effects of Invention

In the optical mode switch according to the present invention, the size of the optical switch can be reduced and any mode light can be switched into any mode light.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 9(a) to FIG. 9(d) are graphs showing the relationship between amount of refractive index change ΔN, ΔN in a refractive index changing region shown in FIG. 1(a) and transmittance of zero-order mode light and first-order mode light, in particular, FIG. 9(a) being a graph showing the relationship between the amount of refractive index change ΔN and the transmittance when the zero-order mode light is inputted, FIG. 9(b) being a graph showing the relationship between the amount of refractive index change ΔN and the transmittance when the zero-order mode light is inputted, FIG. 9(c) being a graph showing the relationship between the amount of refractive index change ΔN and the transmittance when the first-order mode light is inputted, and FIG. 9(d) being a graph showing the relationship between the amount of refractive index change ΔN and the transmittance when the first-order mode light is inputted;

DETAILED DESCRIPTION

First Embodiment of the Present Invention

Figure 1A:
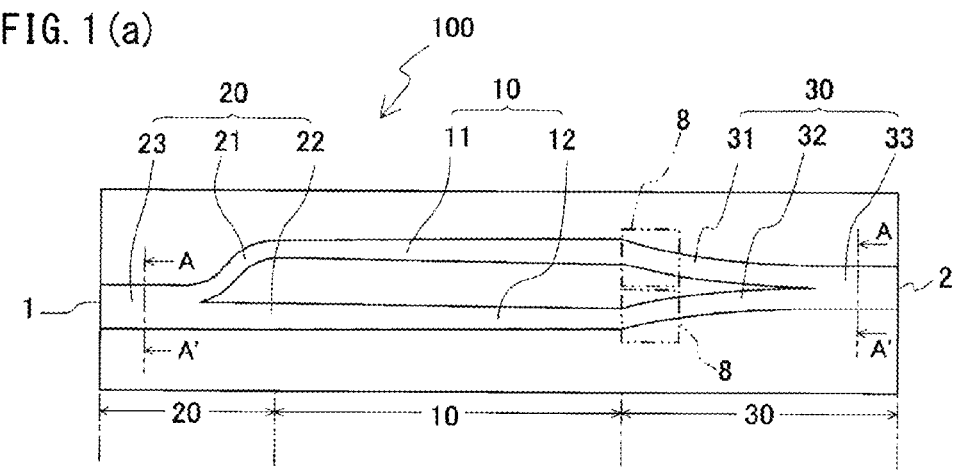
FIG. 1(a) is a plan view showing an example of a schematic configuration of an optical mode switch according to the first embodiment.

Optical mode switch 100 includes single input port 1, single output port 2, mode switch means 101 (not shown) arranged between input port 1 and output port 2.

Mode switch means 101 include optical branch waveguide 20a (not shown) that divides mode light inputted from input port 1, refractive index changing means 8 that is arranged after optical branch waveguide 20a and changes a refractive index of the waveguide, and optical multiplexing waveguide 30a (not shown) that is arranged after refractive index changing means 8 and couples the mode light divided by optical branch waveguide 20a to output the coupled mode light from output port 2.

In the following description, the case in which optical branch waveguide 20a is a Y-shaped waveguide having two waveguides in its posterior part, and optical multiplexing waveguide 30a is a Y-shaped waveguide having two waveguides in its anterior part will be described as an example. However, the number of waveguides between optical branch waveguides 20a and optical multiplexing waveguide 30a is not limited to two. Optical branch waveguide 20a may have three or more waveguides in its posterior part, and optical multiplexing waveguide 30a may have three or more waveguides in its anterior part.

Optical mode switch 100 includes single input port 1, single output port 2, two waveguides 10 that are juxtaposed between input port 1 and output port 2, and refractive index changing means 8 that changes a refractive index of the waveguide by carrier injection by p-intrinsic-n (PIN) diode structure. In optical mode switch 100, arbitrary mode light is inputted to input port 1 and arbitrary mode light is outputted from output port 2.

In addition, optical mode switch 100 according to this embodiment further includes, as shown in FIG. 1(a), Y-branch waveguide 20 that is arranged between input port 1 and two waveguides 10 and branches mode light incident from input port 1 into two, and merge waveguide 30 that is arranged between output port 2 and two waveguides 10 and couples the mode light divided by Y-branch waveguide 20 to emit the resultant mode light to output port 2 side.

In particular, two waveguides 10 according to the present embodiment are tapered linear waveguides (first linear waveguide 11 and second linear waveguide 12) with their waveguide widths gradually changed, according to the difference between the waveguide width of Y-branch waveguide 20 and the waveguide width of merge waveguide 30. Specifically, in first linear waveguide 11, the length of waveguide along a waveguiding direction of light (hereinafter referred to as "waveguide length") is 450 μm, the waveguide width at one end to be coupled with Y-branch waveguide 20 is 0.5 μm, the waveguide width at the other end to be coupled with merge waveguide 30 is 0.6 μm. In second linear waveguide 11, the waveguide length is 450 μm, the waveguide width at one end to be coupled with Y-branch waveguide 20 is 0.7 μm, and the waveguide width at the other end to be coupled with merge waveguide 30 is 0.6 μm.

In the planar view shown in FIG. 1(a), Y-branch waveguide 20 according to the present embodiment has a planar shape in which two divided waveguides (first branched waveguide 21 and second branched waveguide 22) are asymmetric (asymmetric Y-shaped waveguide).

Figure 1B:
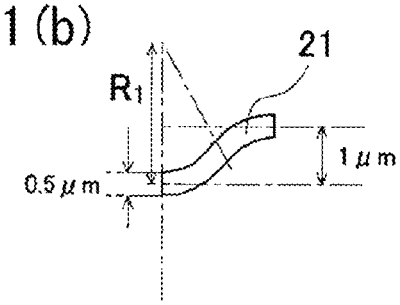
FIG. 1(b) is an illustration for explaining a dimension of a first branch waveguide shown in FIG. 1(a)

Specifically, the region (hereinafter referred to as "pre-branching waveguide 23") except for the two divided waveguides (first branched waveguide 21 and second branched waveguide 22) of Y-branch waveguide 20 is a linear waveguide having the waveguide length of 200 μm and the waveguide width of 1.2 μm. First branched waveguide 21 is a substantially S-shaped curved waveguide in which the waveguide width is 0.5 μm, the difference in the width direction between the center of core at one end to be coupled with pre-branching waveguide 23 and the center of core at the other end to be coupled with first linear waveguide 11 is 1 μm, and the radius of curvature R1 is 5625.25 μm as shown in FIG. 1(b). Second branched waveguide 22 is a linear waveguide in which the waveguide length is 150 μm and the waveguide width is 0.7 μm.

In the planar view shown in FIG. 1(a), merge waveguide 30 according to the present embodiment has a planar shape in which two merging waveguides (first merging waveguide 31 and second merging waveguide 32) are symmetric (symmetric Y-shaped waveguide). Specifically, the region (hereinafter referred to as "post-merging waveguide 33") except for the two merging waveguides (first merging waveguide 31 and second merging waveguide 32) of merge waveguide 30 is a linear waveguide having the waveguide length of 200 μm and the waveguide width of 1.2 μm.

Figure 1C:
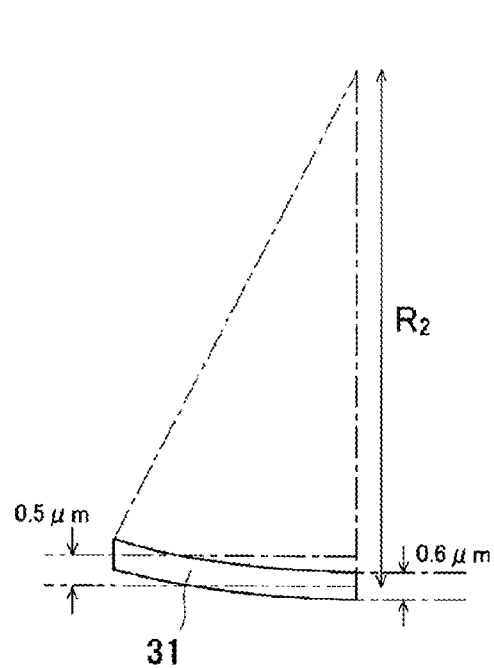
FIG. 1(c) is an illustration for explaining a dimension of a first merge waveguide shown in FIG. 1(a)
Figure 1D:
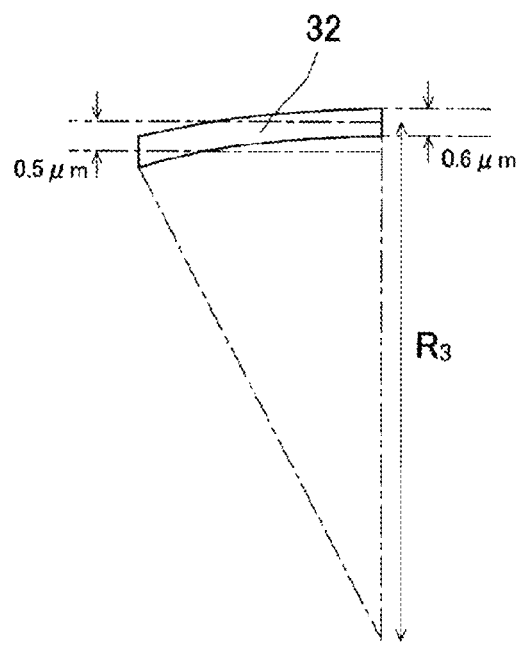
FIG. 1(d) is an illustration for explaining a dimension of a second merge waveguide shown in FIG. 1(a)

First merging waveguide 31 is a curved waveguide that curves inward (center side of merge waveguide 30) in which the waveguide width is 0.6 μm, the difference in the width direction between the center of core at one end to be coupled with first linear waveguide 11 and the center of core at the other end to be coupled with post-merging waveguide 33 is 0.5 μm, and the radius of curvature R2 is 90000.25 μm, as shown in FIG. 1(c). Second merging waveguide 32 is a curved waveguide that curves inward (center side of merge waveguide 30) in which the waveguide width is 0.6 μm, the difference in the width direction between the center of core at one end to be coupled with second linear waveguide 12 and the center of core at the other end to be coupled with post-merging waveguide 33 is 0.5 μm, and the radius of curvature R3 is 90000.25 μm, as shown in FIG. 1(d).

Refractive index changing means 8 according to the present embodiment is arranged in two merging waveguides (first merging waveguide 31 and second merging waveguide 32) of merge waveguide 30.

Figure 2A:
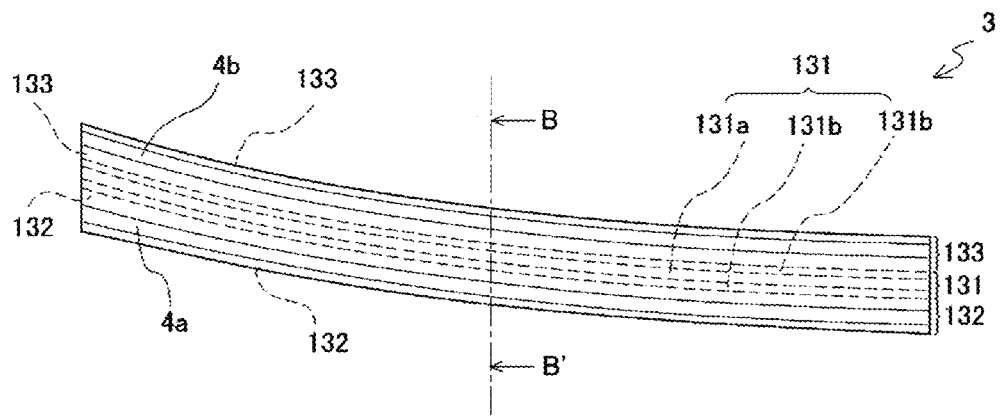
FIG. 2(a) is an enlarged view of a refractive index changing means in the first merge waveguide shown in FIG. 1(a)
Figure 2B:
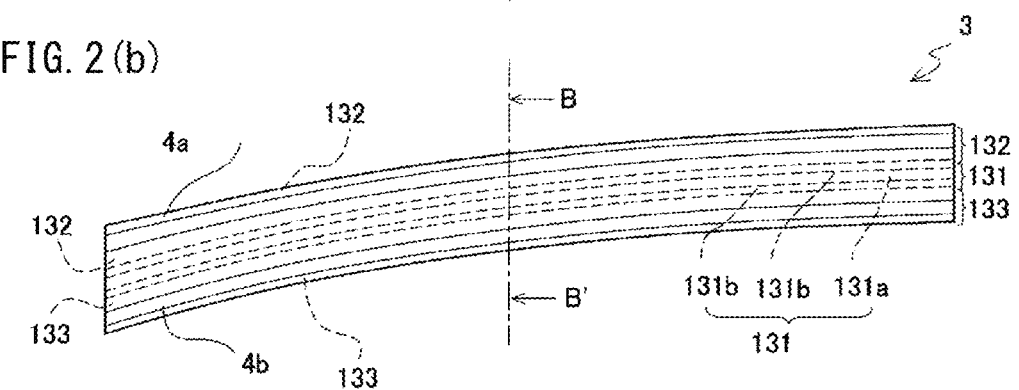
FIG. 2(b) is an enlarged view of a refractive index changing means in the second merge waveguide shown in FIG. 1(a)
Figure 2C:
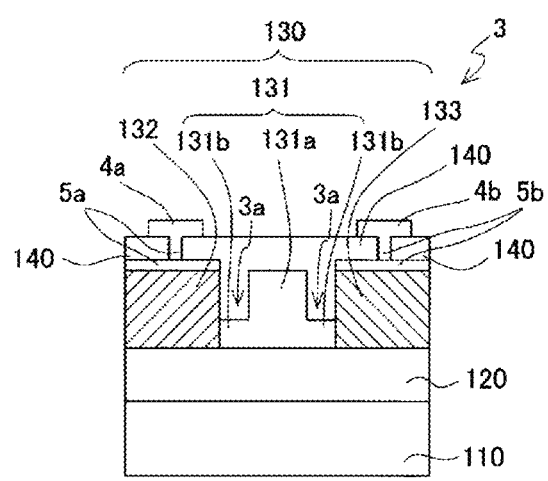
FIG. 2(c) is a cross-sectional view of the refractive index changing means shown in FIG. 2(a) and FIG. 2(b) taken along the line B-B'.
Figure 2D:
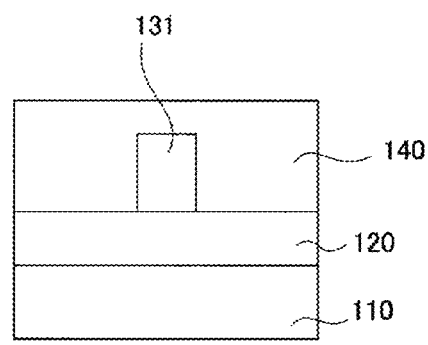
FIG. 2(d) is a cross-sectional view of the optical mode switch shown in FIG. 1(a) taken along the line A-A'.

Furthermore, optical mode switch 100 includes: first clad layer 120 (e.g., $SiO_2$ layer of silicon-on-insulator (SOI) substrate) laminated onto substrate 110 (e.g., Si substrate of SOI substrate); semiconductor layer 130 (e.g., Si layer of SOI substrate) that is laminated onto first clad layer 120 and includes intrinsic (i-type) semiconductor region 131 having a refractive index higher than the refractive index of first clad layer 120; and second semiconductor layer 140 (e.g., $SiO_2$ layer) that is laminated onto semiconductor layer 130 and has a refractive index lower than the refractive index of semiconductor layer 130, as shown in FIG. 2(c) and FIG. 2(d).

Refractive index changing means 8 includes: refractive index changing region 3 in which p-type semiconductor region 132 and n-type semiconductor region 133, which are formed by doping an impurity to intrinsic semiconductor region 131 of semiconductor layer 130, are juxtaposed in the waveguiding direction along with intrinsic semiconductor region 131 to constitute pin junction; first electrode 4a for applying a voltage to p-type semiconductor region 132 of refractive index changing region 3; second electrode 4b for applying a voltage to n-type semiconductor region 133 of refractive index changing region 3; first connection 5a that electrically connects p-type semiconductor region 132 and first electrode 4a; and second connection 5b that electrically connects n-type semiconductor region 133 and second electrode 4b, as shown in FIG. 2(a), FIG. 2(b) and FIG. 2(c).

In refractive index changing region 3, when a forward voltage is applied to the pin junction through first electrode 4a and first connection 5a and second electrode 4b and second connection 5b, carriers (electrons and holes) are supplied to intrinsic semiconductor region 131. By the plasma effect of the carriers, the refractive index of intrinsic semiconductor region 131 will change.

Semiconductor layer 130 of refractive index changing region 3 according to the present embodiment is composed of: intrinsic semiconductor region 131 formed of Si as an intrinsic semiconductor; p-type semiconductor region 132 formed by doping boron (B), as an impurity, to Si of the intrinsic semiconductor; and n-type semiconductor region 133 formed by doping phosphorus (P), as an impurity, to Si of the intrinsic semiconductor.

Refractive index changing region 3 has a structure in which intrinsic semiconductor region 131 has two grooves (trench 3a) extending in the waveguiding direction at respective boundaries with p-type semiconductor region 132 and n-type semiconductor region 133. In particular, when the width of trench 3a (hereinafter referred to as "trench width $W_t$") of refractive index changing region 3 is set to the wavelength order or less (hereinafter referred to as "narrowed trench structure"), overetching can be suppressed using the effect (reactive ion etching lag: RIE lag) that the narrower the pattern is, the shallower the etching depth becomes and less the etching depth amount becomes than the surroundings.

Moreover, intrinsic semiconductor region 131 of refractive index changing region 3 includes: rib portion 131a that becomes a waveguide; and slab portion 131b that has a thickness (a thickness of the etched Si layer, hereinafter referred to as "Si layer residual thickness $T_{Si}$") thinner than the thickness (a thickness of the unetched Si layer, hereinafter referred to as "Si layer overall thickness d") of rib portion 131a and that is juxtaposed on both sides of rib portion 131a in the waveguiding direction. In addition, rib portion 131a according to this embodiment is a part of each of the two waveguides (first merging waveguide 31 and second merging waveguide 32) as shown in FIG. 1A.

Further, all of p-type semiconductor region 132 and n-type semiconductor region 133 have a thickness thicker than the thickness (Si layer residual thickness $T_{Si}$) of slab portion 131b of intrinsic semiconductor region 131.

Next, a method of fabrication optical mode switch 100 will be explained with reference to FIG. 3(a) to FIG. 8(f). In addition, sectional views showing the fabrication process of two waveguides 10 (first linear waveguide 11 and second linear waveguide 12) and Y-branch waveguide 20 (first branched waveguide 21 and first branched waveguide 21) will be omitted because two waveguides 10 (first linear waveguide 11 and second linear waveguide 12) and Y-branch waveguide 20 (first branched waveguide 21 and second linear waveguide 12) are different from pre-branching waveguide 23 and merge waveguide 30 only in waveguide width but are the same with pre-branching waveguide 23 and merge waveguide 30 in the fabrication process First, the SOI substrate (the Si substrate (substrate 110), the SiO2 layer (first clad layer 120), and the Si layer (semiconductor layer 130)) is coated with a photoresist on semiconductor layer 130. Then, using a photolithography method with a stepper, mask 161 for etching is formed on semiconductor layer 130 (FIG. 3(a) and FIG. 6(a)) to fit the planar shape of the waveguiding region (two waveguides 10, Y-branch waveguide 20, and merge waveguide 30) shown in FIG. 1(a) and the region (rib portion 131a of intrinsic semiconductor region 131, p-type semiconductor region 132, and n-type semiconductor region 133) except for slab portion 131b of refractive index changing region 3 shown in FIG. 2(a) and FIG. 2(b).

Figure 3A:
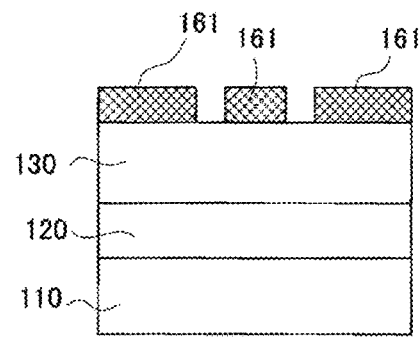
FIG. 3(a) to FIG. 3(f) are sectional views corresponding to FIG. 2(c) for explaining a method of fabrication the optical mode switch shown in FIG. 1.
Figure 3D:
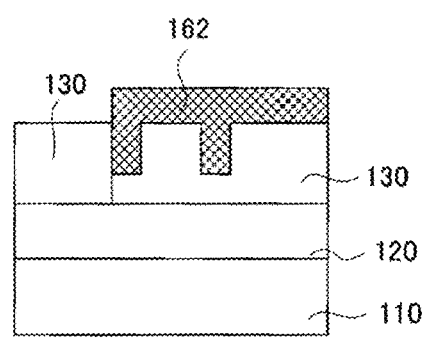
Figure 3B:
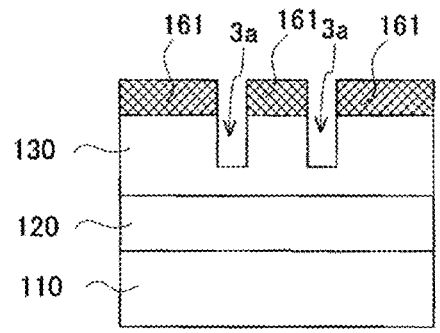
Figure 6A:
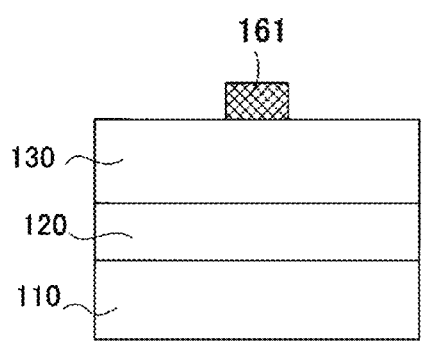
FIG. 6(a) to FIG. 6(f) are sectional views corresponding to FIG. 2(d) for explaining the method of fabrication the optical mode switch shown in FIG. 1.
Figure 6B:
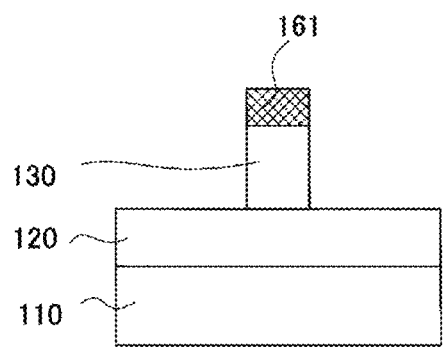
Figure 6C:
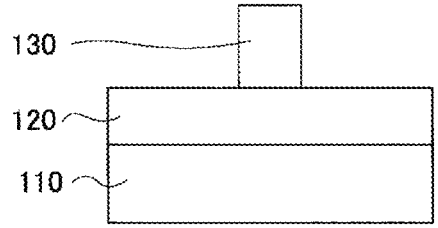
Figure 6D:
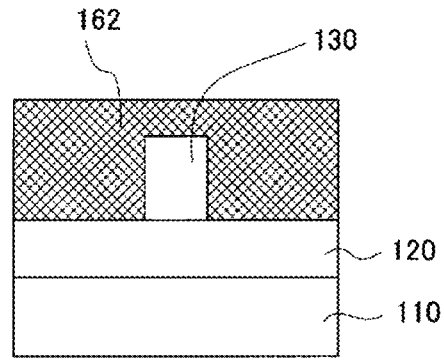

By using this mask 161, through dry etching by RIE (reactive ion etching) method, non-waveguiding regions shown in FIG. 1(a) and unnecessary portions, which will be slab portion 131b shown in FIG. 2(a) and FIG. 2(b), of semiconductor layer 130 are removed partially (only portions in which mask 161 is not formed) to form core layers of the waveguiding region and trench 3a (FIG. 3(b) and FIG. 6(b)). In this case, openings of mask 161 in slab portion 131b shown in FIG. 2(a) and FIG. 2(b) have a size of wavelength order or less and are extremely narrow compared to openings of mask 161 in the non-waveguiding region shown in FIG. 1(a). By RIE lag effect, therefore, semiconductor layer 130 will remain as slab portion 131b (that is, overetching will be suppressed), even when dry etching in the non-waveguiding region has ended. Then, mask 161 on semiconductor layer 130 is removed by an organic solvent and an ashing method (FIG. 3(c) and FIG. 6(c)).

Thus, by using only mask 161, the thickness of semiconductor layer 130 that will be p-type semiconductor region 132 and n-type semiconductor region 133 will be substantially the same as the thickness (Si layer overall thickness d) of semiconductor layer 130 that will be rib portion 131a of intrinsic semiconductor region 131.

In addition, when the thickness of semiconductor layer 130 that will be p-type semiconductor region 132 and n-type semiconductor region 133 is made thinner than the thickness (Si layer overall thickness d) of semiconductor layer 130 that will be rib portion 131a of intrinsic semiconductor region 131, the thickness of semiconductor layer 130 that will be p-type semiconductor region 132 and n-type semiconductor region 133 needs to be controlled such that the thickness (Si layer residual thickness $T_{Si}$) of semiconductor layer 130 that will be slab portion 131b of intrinsic semiconductor region 131 will be at least 0.01 μm or more.

Then, a photoresist is coated onto first clad layer 120 and semiconductor layer 130 that are exposed. Then, using a photolithography method by a stepper, mask 162 for a dopant is formed on exposed first clad layer 120 and semiconductor layer 130 to fit the planar shape of the region except for p-type semiconductor region 132 shown in FIG. 2(a) and FIG. 2(b). Then, p-type dopant (for example, boron) ions are implanted into openings of semiconductor layer 130 (FIG. 3(d) and FIG. 6(d)). Then, mask 162 on first clad layer 120 and semiconductor layer 130 is removed by an organic solvent and an ashing method (FIG. 3(e) and FIG. 6(e)).

Then, a photoresist is coated onto first clad layer 120 and semiconductor layer 130 that are exposed. Then, using a photolithography method by a stepper, mask 163 for a dopant is formed on exposed first clad layer 120 and semiconductor layer 130 to fit the planar shape of the region except for n-type semiconductor region 133 shown in FIG. 2(a) and FIG. 2(b). Then, n-type dopant (for example, phosphorus) ions are implanted into openings of semiconductor layer 130 (FIG. 3(f) and FIG. 6(f)).

Figure 3E:
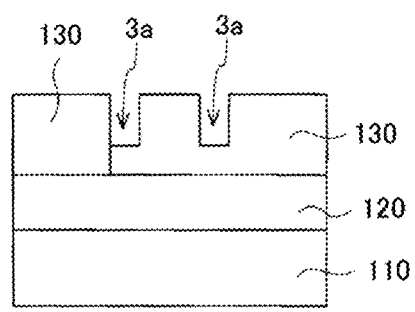
Figure 3C:
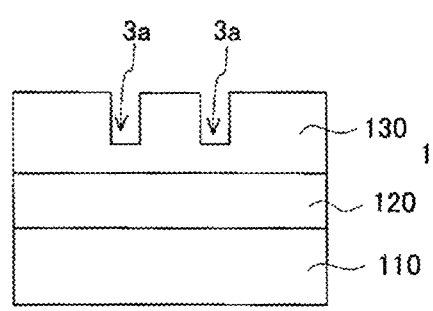
Figure 3F:
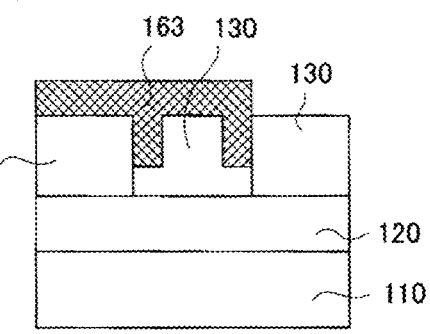
Figure 4A:
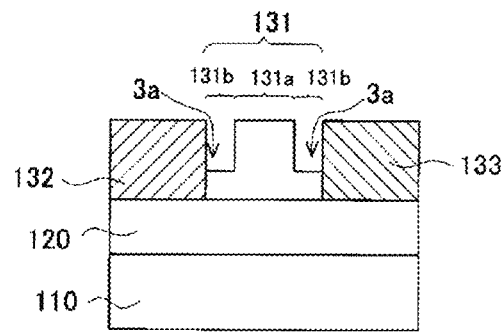
FIG. 4(a) to FIG. 4(e) are cross-sectional views for explaining the continuation of the fabrication method of the optical mode switch shown in FIG. 3(a) to FIG. 3(f)
Figure 6E:
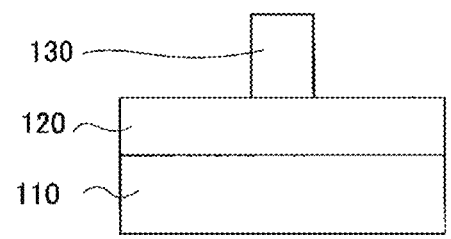
Figure 6F:
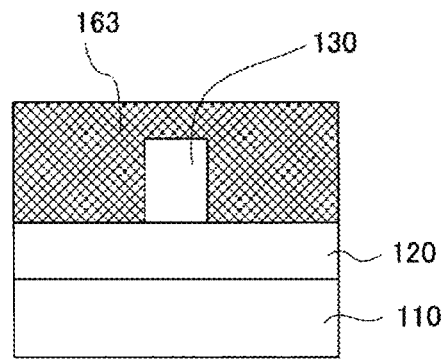
Figure 7A:
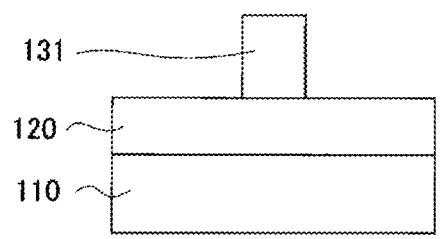
FIG. 7(a) to FIG. 7(e) are cross-sectional views for explaining the continuation of the fabrication method of the optical mode switch shown in FIG. 6(a) to FIG. 6(f)

Then, mask 163 on first clad layer 120 and semiconductor layer 130 is removed by an organic solvent and an ashing method (FIG. 3(e) and FIG. 6(e)) and heat treatment to activate the impurity is performed to form p-type semiconductor region 132 and n-type semiconductor region 133 (FIG. 4(a) and FIG. 7(a)). In this case, the region except for p-type semiconductor region 132 and n-type semiconductor region 133 of semiconductor layer 130 will be intrinsic semiconductor region 131, and intrinsic semiconductor region 131 in refractive index changing region 3 will include rib portion 131a and slab portion 131b.

Then, a photoresist having the thickness of about 1 μm is coated onto first clad layer 120 and semiconductor layer 130 that are exposed. Then, using a photolithography method by a stepper, mask 164 for etching is formed to fit the planar shape of the region except for p-type semiconductor region 132 and n-type semiconductor region 133 shown in FIG. 2(a) and FIG. 2(b) (FIG. 4(b) and FIG. 7(b)).

Figure 4D:
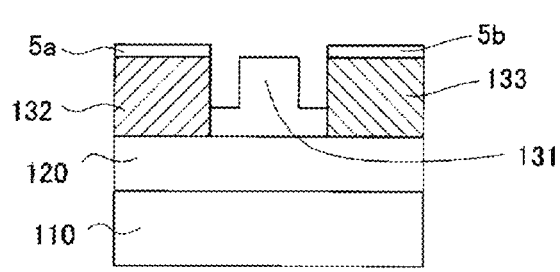
Figure 4B:
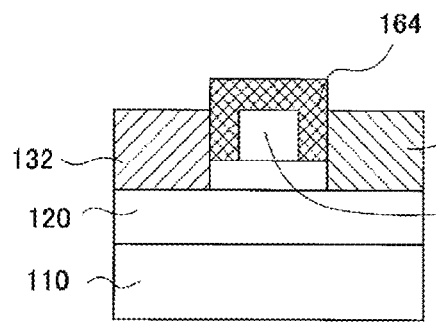
Figure 4E:
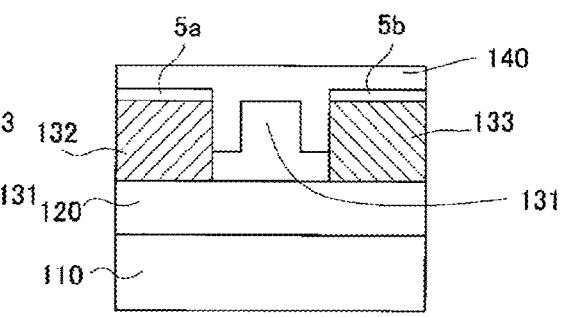
Figure 4C:
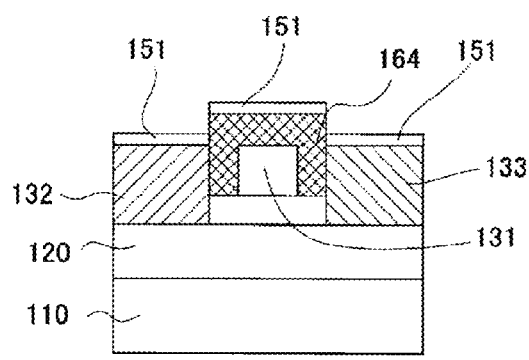
Figure 7D:
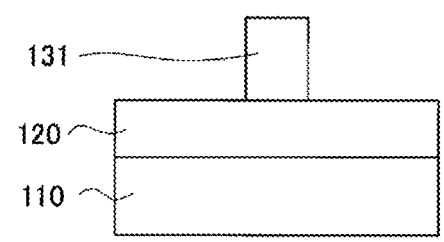
Figure 7B:
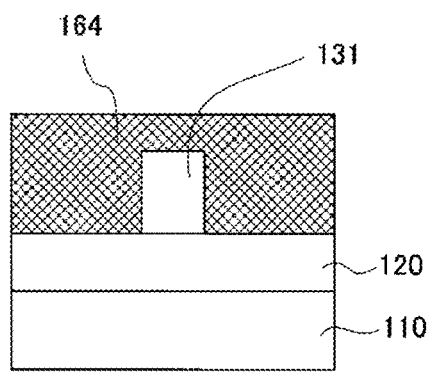
Figure 7E:
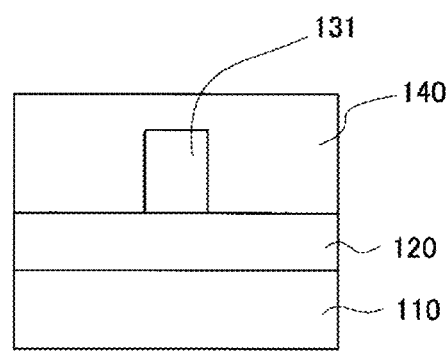
Figure 7C:
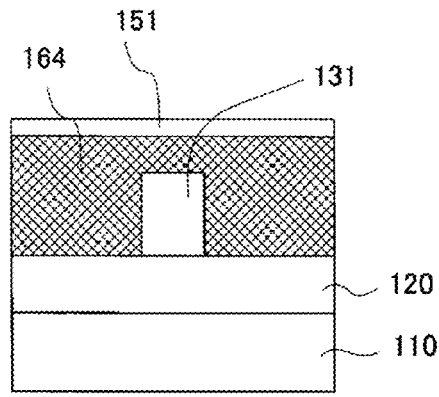

Then, using an electron beam evaporation method or sputtering, a metal (Ti (titanium)/Al (aluminum)) that becomes part of first connection 5a and second connection 5b is deposited on p-type semiconductor region 132, n-type semiconductor region 133, and mask 164 to form first metal layer 151 (FIG. 4(c) and FIG. 7(c)).

Then, mask 164 on first clad layer 120 and intrinsic semiconductor region 131 is removed by an organic solvent, and first metal layer 151 in the region except for p-type semiconductor region 132 and n-type semiconductor region 133 is removed (lift-off) to form part of first connection 5a and second connection 5b each comprising a Ti layer with a thickness of about 50 nm and an Al layer with a thickness of about 100 nm (FIG. 4(d) and FIG. 7(d)).

Then, using chemical vapor deposition (CVD) method, a $SiO_2$ film is deposited on first clad layer 120 and semiconductor layer 130 that are exposed, to form second clad layer 140 (FIG. 4(e) and FIG. 7(e)).

Then, a photoresist is coated onto second clad layer 140. Then, using a photolithography method by a stepper, to form contact hole 5 as first connection 5a and second connection 5b, mask 165 for etching is formed on second clad layer 140 to fit the planar shape of the region except for such contact hole 5 (FIG. 5(a) and FIG. 8(a)).

Figure 5A:
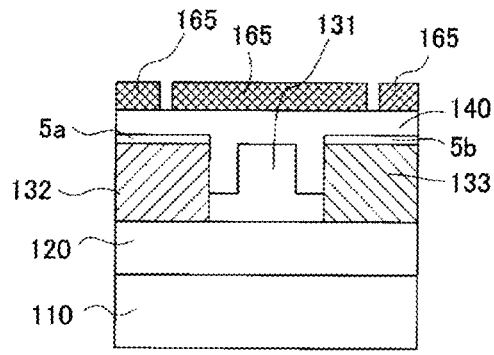
FIG. 5(a) to FIG. 5(f) are cross-sectional views for explaining the continuation of the fabrication method of the optical mode switch shown in FIG. 4(a) to FIG. 4(e)
Figure 5D:
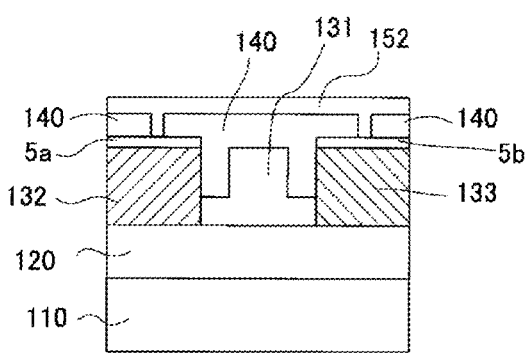
Figure 5B:
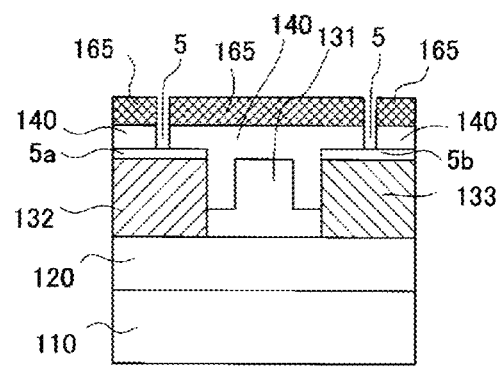
Figure 5E:
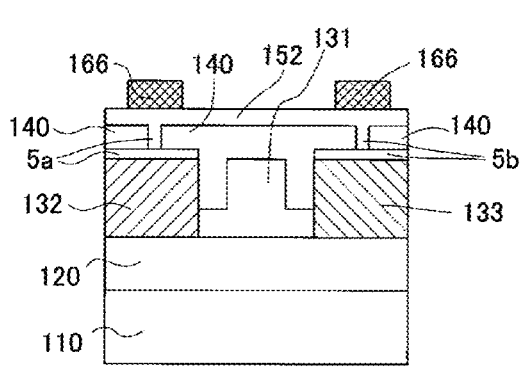
Figure 5C:
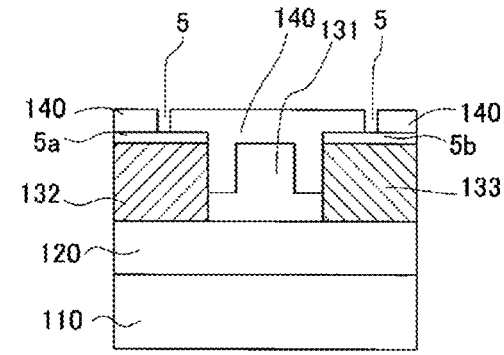
Figure 8A:
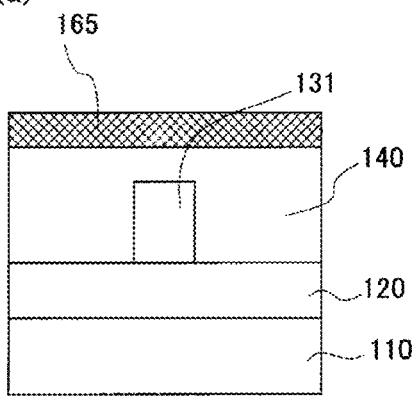
FIG. 8(a) to FIG. 8(f) are cross-sectional views for explaining the continuation of the fabrication method of the optical mode switch shown in FIG. 7(a) to FIG. 7(e)
Figure 8B:
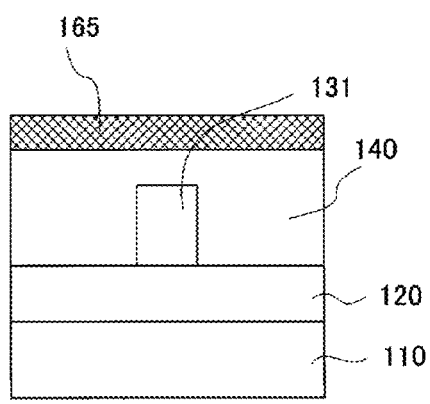
Figure 8C:
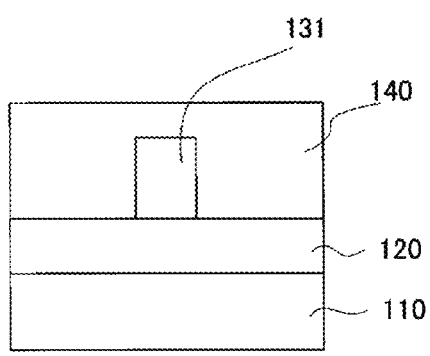

By using this mask 165, through dry etching by RIE method, portions to be contact hole 5 in second clad layer 140 are partially removed to form contact hole 5 (FIG. 5(b) and FIG. 8(b)). Then, mask 165 on second clad layer 140 is removed by an organic solvent and an ashing method (FIG. 5(c) and FIG. 8(c)).

Figure 8D:
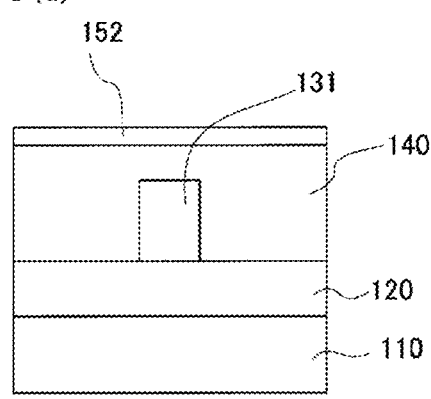
Figure 8E:
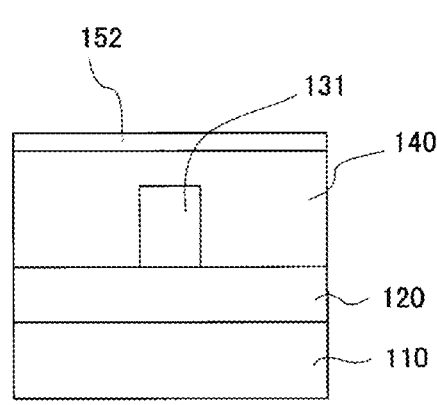

Then, using an electron beam evaporation method, a metal (Ti/Al) that becomes part of first connection 5a and second connection 5b as well as first electrode 4a and second electrode 4b is deposited in contact hole 5 and on second clad layer 140 to form second metal layer 152 (FIG. 5(d) and FIG. 8(d)).

Then, a photoresist is coated onto second metal layer 152. Then, using a photolithography method by a stepper, mask 166 for etching is formed on second metal layer 152 to fit the planar shape of first electrode 4a and second electrode 4b shown in FIG. 2(a) and FIG. 2(b) (FIG. 5(e) and FIG. 8(e)).

Figure 5F:
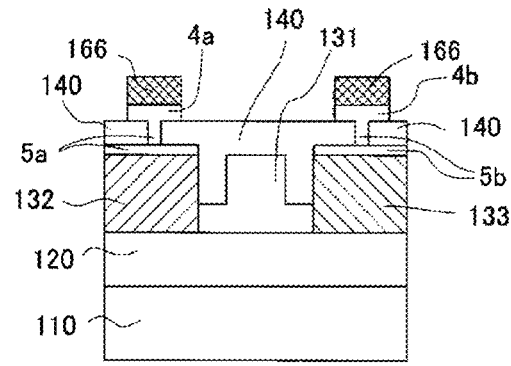
Figure 8F:
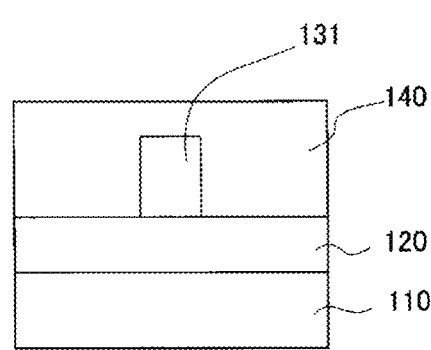
Figure 10A:
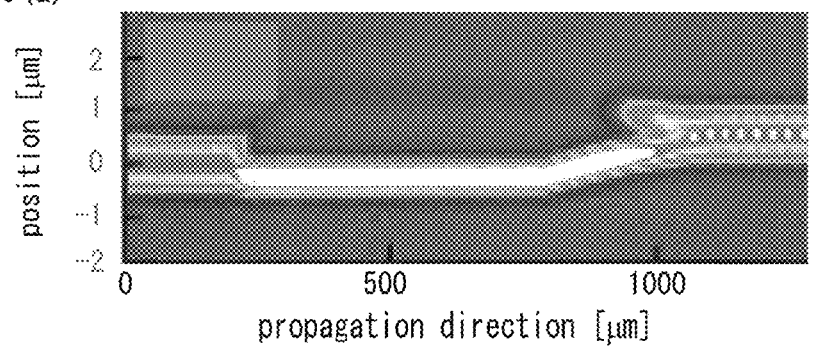
FIG. 10(a) to FIG. 10(d) show an operational simulation of the optical mode switch shown in FIG. 1(a) to FIG. 1(d), in particular, FIG. 10(a) being an explanatory drawing showing an optical field in which the zero-order mode light is inputted and the amount of refractive index change ΔN is set to −0.017, FIG. 10(b) being an explanatory drawing showing an optical field in which the zero-order mode light is inputted and the amount of refractive index change ΔN is set to −0.023, FIG. 10(c) being an explanatory drawing showing an optical field in which the first-order mode light is inputted and the amount of refractive index change ΔN is set to −0.017, and FIG. 10(d) being an explanatory drawing showing an optical field in which the first-order mode light is inputted and the amount of refractive index change ΔN is set to −0.023.
Figure 10B:
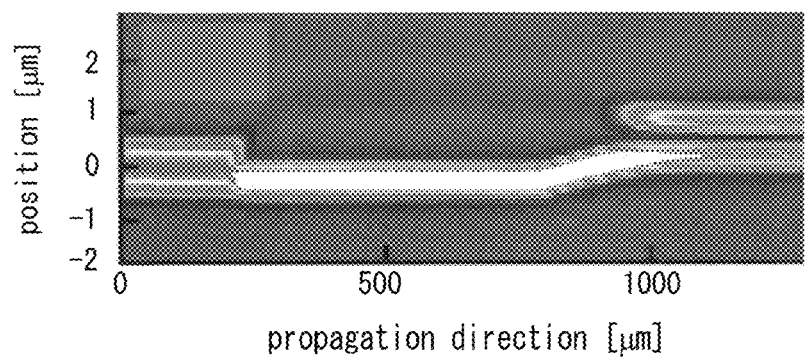
Figure 10C:
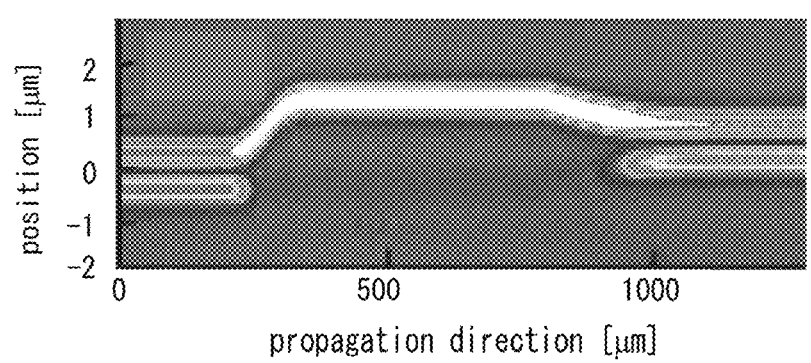
Figure 10D:
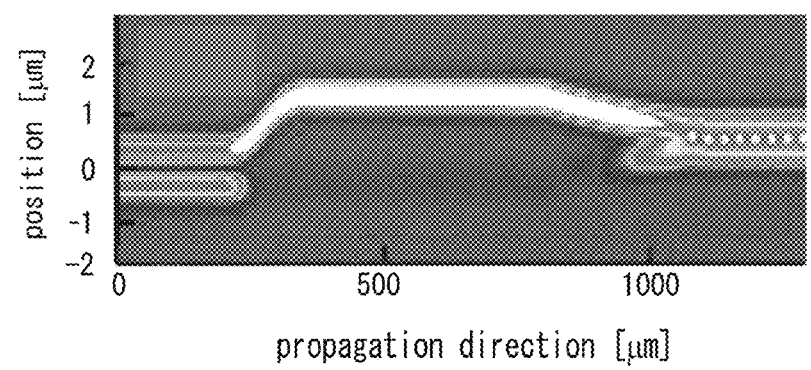

By using this mask 166, through dry etching by ion milling method, second metal layer 152 in the region except for first electrode 4a and second electrode 4b are removed (FIG. 5(f) and FIG. 8(f)), and mask 166 on first electrode 4a and second electrode 4b is removed by an organic solvent and an ashing method to form first electrode 4a and second electrode 4b (FIG. 2(c) and FIG. 2(d)).

Finally, an optical mode switch 100 element having the structure shown in FIG. 1 and FIG. 2 can be obtained by cleaving substrate 110, in which a plurality of optical mode switch 100 elements have been formed, along the boundaries between the optical mode switch 100 elements. It should be noted that, by this cleavage, a rear end facet (input port 1) and a front end facet (output port 2) of the optical mode switch 100 element is formed, respectively.

In the fabrication method according to the present embodiment, the RIE method is used as an etching method for the semiconductor layer: an inductively coupled plasma (ICP) method or a wet etching method may also be applicable. Further, in the fabrication method according to the present embodiment, an ion milling method is used as an etching method for the metal layer: a wet etching method may also be applicable. Further, in the fabrication method according to the present embodiment, a stepper is used for a photolithography method: however, it is not necessarily limited to this. For example, an electron beam exposure apparatus may also be applicable.

Next, the operation of optical mode switch 100 will be described with reference to FIG. 1(a), FIG. 9, and FIG. 10. Mode light incident on input port 1 of optical mode switch 100 enters pre-branching waveguide 23 of Y-branch waveguide 20.

Here, when the structure of a waveguide changes gradually, the power of each mode is saved, which is called adiabatic process. Further, when the adiabatic process is established, it is called satisfying adiabatic condition. Y-branch waveguide 20, which gradually changes in waveguide structure, satisfies the adiabatic condition and performs mode sorting.

That is, when incident from input port 1, zero-order mode light propagates through a wide waveguide (second branched waveguide 22) of Y-branch waveguide 20. Also, when incident from input port 1, first-order mode light propagates through a narrow waveguide (first branched waveguide 21) of Y-branch waveguide 20 after switched to the zero-order mode light.

Note that the mode existing in pre-branching waveguide 23 and the mode existing in first branched waveguide 21 and second branched waveguide 22 are linked one-on-one in order from the mode having a larger propagation constant (proportional to transmission refractive index) and, therefore, it is called mode sorting.

When mode light incident on input port 1 of optical mode switch 100 is zero-order mode light, the zero-order mode light proceeds to second branched waveguide 22 side of Y-branch waveguide 20, propagates through second linear waveguide 12, and is incident on second merging waveguide 32 of merge waveguide 30.

Also, when mode light incident on input port 1 of optical mode switch 100 is first-order mode light, the first-order mode light proceeds to first branched waveguide 21 side to switch to zero-order mode light, propagates through first linear waveguide 11, and is incident on first merging waveguide 31 of merge waveguide 30.

In this state, when a voltage is applied to first electrode 4a and second electrode 4b of optical mode switch 100, forward bias is applied to the pin junction composed of p-type semiconductor region 132, intrinsic semiconductor region 131, and n-type semiconductor region 133. This will cause carriers to be supplied from p-type semiconductor region 132 and n-type semiconductor region 133 to rib portion 131a of intrinsic semiconductor region 131. The supplied carries accumulate in rib portion 131a. By the plasma effect of the carriers, it is possible to change the refractive index of rib portion 131a.

Here, in optical mode switch 100 shown in FIG. 1(a), unnecessary mode components will be generated when mode light incident on input port 1 is switched to another mode light by refractive index changing means 8 or subjected to non-conversion. Therefore, it is necessary to suppress the ratio of unnecessary mode component to necessary mode component (inter-mode crosstalk).

Therefore, it can be considered to provide refractive index changing region 3 of refractive index changing means 8 with appropriate amount of refractive index change $\Delta N$, $\Delta N$, based on the relationship, shown in FIG. 9(a) to FIG. 9(d), between amount of refractive index change $\Delta N$ in refractive index changing region 3 of refractive index changing means 8 arranged in first merging waveguide 31 and amount of refractive index change $\Delta N$ in refractive index changing region 3 of refractive index changing means 8 arranged in second merging waveguide 32 and transmittance of zero-order mode light or first-order mode light to incident zero-order mode light or first-order mode light.

That is, when mode light incident on input port 1 is zero-order mode light, optical mode switch 100 can transmit the zero-order mode light as it is, by setting the amount of refractive index change $\Delta N$ in refractive index changing region 3 of refractive index changing means 8 in first merging waveguide 31 to −0.017 and the amount of refractive index change $\Delta N$ in refractive index changing region 3 of refractive index changing means 8 in second merging waveguide 32 to 0, as shown in FIG. 9(*a*), and emit the zero-order mode light from output port 2 via post-merging waveguide 33 of merge waveguide 30, as shown in FIG. 10(*a*). In this case, the inter-mode crosstalk, which is the ratio of unnecessary mode component (the zero-order mode light) to necessary mode component (the first-order mode light), is 29.2 dB, as shown in FIG. 9(*a*).

Also, when mode light incident on input port 1 is zero-order mode light, optical mode switch 100 can switch the zero-order mode light into first-order mode light to transmit, by setting the amount of refractive index change ΔN in refractive index changing region 3 of refractive index changing means 8 in second merging waveguide 32 to −0.023 and the amount of refractive index change ΔN in refractive index changing region 3 of refractive index changing means 8 in first merging waveguide 31 to 0, as shown in FIG. 9(*b*), and emit the first-order mode light from output port 2 via post-merging waveguide 33 of merge waveguide 30, as shown in FIG. 10(*b*). In this case, the inter-mode crosstalk, which is the ratio of unnecessary mode component (the zero-order mode light) to necessary mode component (the first-order mode light), is 29.2 dB, as shown in FIG. 9(*b*).

Similarly, when mode light incident on input port 1 is first-order mode light, optical mode switch 100 can transmit the first-order mode light as it is, by setting the amount of refractive index change ΔN in refractive index changing region 3 of refractive index changing means 8 in first merging waveguide 31 to −0.017 and the amount of refractive index change ΔN in refractive index changing region 3 of refractive index changing means 8 in second merging waveguide 32 to 0, as shown in FIG. 9(*c*), and emit the first-order mode light from output port 2 via post-merging waveguide 33 of merge waveguide 30, as shown in FIG. 10(*c*). In this case, the inter-mode crosstalk, which is the ratio of unnecessary mode component (the zero-order mode light) to necessary mode component (the first-order mode light), is 29.4 dB, as shown in FIG. 9(*c*).

Also, when mode light incident on input port 1 is zero-order mode light, optical mode switch 100 can switch the first-order mode light into zero-order mode light to transmit, by setting the amount of refractive index change ΔN in refractive index changing region 3 of refractive index changing means 8 in second merging waveguide 32 to −0.023 and the amount of refractive index change ΔN in refractive index changing region 3 of refractive index changing means 8 in first merging waveguide 31 to 0, as shown in FIG. 9(*d*), and emit the zero-order mode light from output port 2 via post-merging waveguide 33 of merge waveguide 30, as shown in FIG. 10(*d*). In this case, the inter-mode crosstalk, which is the ratio of unnecessary mode component (the first-order mode light) to necessary mode component (the zero-order mode light), is 29.3 dB, as shown in FIG. 9(*d*).

As described above, optical mode switch 100 according to this embodiment can, by providing refractive index changing region 3 of refractive index changing means 8 with appropriate amount of refractive index change, suppress the inter-mode crosstalk, and selectively emit (switch) the zero-order mode light or first-order mode light, and switch any mode light incident on input port 1 to any mode light to emit from output port 2.

Second Embodiment of the Present Invention

Figure 11A:
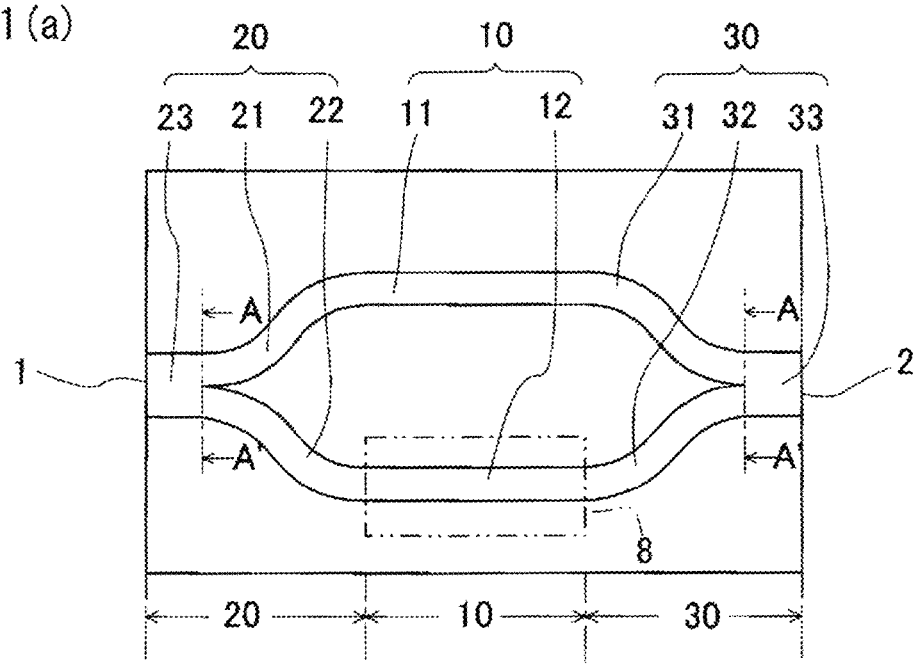
FIG. 11(a) is a plan view showing an example of a schematic configuration of an optical mode switch according to the second embodiment.
Figure 11B:
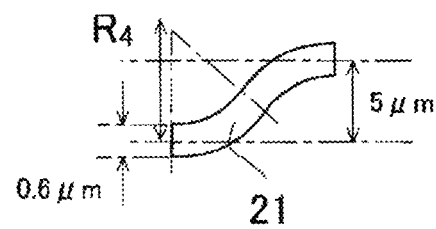
FIG. 11(b) is an illustration for explaining a dimension of a first branch waveguide shown in FIG. 11(a)
Figure 11C:
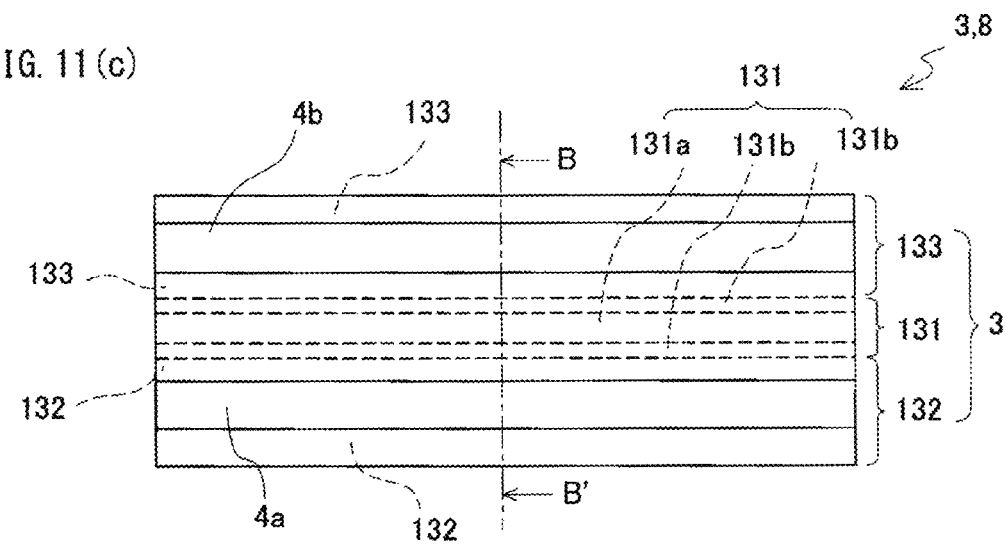
FIG. 11(c) is an enlarged view of a refractive index changing means in a second linear waveguide shown in FIG. 11(a)

FIG. 11(*a*) is a plan view showing an example of a schematic configuration of an optical mode switch according to the second embodiment, FIG. 11(*b*) is an illustration for explaining a dimension of a first branch waveguide shown in FIG. 11(*a*), and FIG. 11(*c*) is an enlarged view of a refractive index changing means in a second linear waveguide shown in FIG. 11(*a*). FIG. 12(*a*) is a graph showing the relationship between the amount of refractive index change ΔN and the transmittance when the zero-order mode light is inputted, and FIG. 12(*b*) is a graph showing the relationship between the amount of refractive index change ΔN and the transmittance when the first-order mode light is inputted. FIG. 13(*a*) is an explanatory drawing showing an optical field in which the zero-order mode light is inputted and the amount of refractive index change ΔN is set to 0, FIG. 13(*b*) is an explanatory drawing showing an optical field in which the zero-order mode light is inputted and the amount of refractive index change ΔN is set to −0.0039, FIG. 13(*c*) is an explanatory drawing showing an optical field in which the first-order mode light is inputted and the amount of refractive index change ΔN is set to 0, and FIG. 13(*d*) is an explanatory drawing showing an optical field in which the first-order mode light is inputted and the amount of refractive index change ΔN is set to −0.0039. In FIG. 11(*a*) to FIG. 11(*c*), the same reference numerals as in FIG. 1(*a*) to FIG. 8(*f*) show the same or corresponding parts, and description thereof will be omitted.

Two waveguide 10 according to the present embodiment are linear waveguides (first linear waveguide 11 and second linear waveguide 12) each having a constant waveguide width, since the waveguide width of Y-branch waveguide 20 and the waveguide width of merge waveguide 30 are the same. Specifically, first linear waveguide 11 and second linear waveguide 12 have the waveguide length of 200 μm, the waveguide width of 0.6 μm at one end to be coupled with Y-branch waveguide 20 is 0.5 μm, and the waveguide width of 0.6 μm at the other end to be coupled with merge waveguide 30.

In the planar view shown in FIG. 11(*a*), Y-branch waveguide 20 according to the present embodiment has a planar shape in which two divided waveguides (first branched waveguide 21 and second branched waveguide 22) are symmetric (symmetric Y-shaped waveguide). Specifically, the region (pre-branching waveguide 23) except for the two divided waveguides (first branched waveguide 21 and second branched waveguide 22) of Y-branch waveguide 20 is a linear waveguide having the waveguide length of 50 μm and the waveguide width of 1.2 μm.

First branched waveguide 21 is a substantially S-shaped curved waveguide in which the waveguide width is 0.6 μm, the difference in the width direction between the center of core at one end to be coupled with pre-branching waveguide 23 and the center of core at the other end to be coupled with first linear waveguide 11 is 5 μm, and the radius of curvature $R_4$ is 1126.25 μm, as shown in FIG. 11(*b*). Second branched waveguide 22, which has a planar shape in which first branched waveguide 21 shown in FIG. 11(*b*) is reversed upside down, is a substantially S-shaped curved waveguide in which the waveguide width is 0.6 μm, the difference in the width direction between the center of core at one end to be coupled with pre-branching waveguide 23 and the center of core at the other end to be coupled with second linear waveguide 12 is 5 μm, and the radius of curvature $R_4$ is 1126.25 μm.

In the planar view shown in FIG. 11(*a*), merge waveguide 30 according to the present embodiment has a planar shape in which two merging waveguides (first merging waveguide 31 and second merging waveguide 32) are symmetric (symmetric Y-shaped waveguide). Specifically, the region (post-merging waveguide 33) except for the two merging waveguides (first merging waveguide 31 and second merging waveguide 32) of merge waveguide 30 is a linear waveguide having the waveguide length of 150 μm and the waveguide width of 1.2 μm.

First merging waveguide 31, which has a planar shape in which first branched waveguide 21 shown in FIG. 11(b) is reversed to right and left, is a substantially S-shaped curved waveguide in which the waveguide width is 0.6 μm, the difference in the width direction between the center of core at one end to be coupled with first linear waveguide 11 and the center of core at the other end to be coupled with post-merging waveguide 33 is 5 μm, and the radius of curvature $R_4$ is 1126.25 μm. Second merging waveguide 32, which has a planar shape in which first branched waveguide 21 shown in FIG. 11(b) is reversed to right and left and upside down, is a substantially S-shaped curved waveguide in which the waveguide width is 0.6 μm, the difference in the width direction between the center of core at one end to be coupled with second linear waveguide 12 and the center of core at the other end to be coupled with post-merging waveguide 33 is 5 μm, and the radius of curvature $R_4$ is 1126.25 μm.

Refractive index changing means 8 according to the present embodiment is arranged in second linear waveguide 12 of two waveguides 10 (first linear waveguide 11 and second linear waveguide 12) that are juxtaposed between input port 1 and output port 2.

Next, the operation of optical mode switch 100 will be described with reference to FIG. 11(a), FIG. 12, and FIG. 13. Mode light incident on input port 1 of optical mode switch 100 enters pre-branching waveguide 23 of Y-branch waveguide 20.

Then, mode light incident on pre-branching waveguide 23 of Y-branch waveguide 20 is equally divided and branched into two. One equally-divided mode light propagates through first branched waveguide 21 and first linear waveguide 11 and enters first merging waveguide 31 of merge waveguide 30. Another equally-divided mode light propagates through first branched waveguide 2l second branched waveguide 22 and second linear waveguide 12 (refractive index changing region 3 of refractive index changing means 8) and enters second merging waveguide 32 of merge waveguide 30.

In this state, when a voltage is applied to first electrode 4a and second electrode 4b of optical mode switch 100, forward bias is applied to the pin junction composed of p-type semiconductor region 132, intrinsic semiconductor region 131, and n-type semiconductor region 133. This will cause carriers to be supplied from p-type semiconductor region 132 and n-type semiconductor region 133 to rib portion 131a of intrinsic semiconductor region 131. The supplied carries accumulate in rib portion 131a. By the plasma effect of the carriers, it is possible to change the phase of the other mode light by π [rad] with respect to the phase of the one mode light.

Then, when the phase of the other mode light is different from the phase of the one mode light by π [rad], post-merging waveguide 33 of merge waveguide 30 emits, from output port 2, mode light that is different from the mode light incident on input port 1, by superposing the one equally-divided mode light on the other equally-divided mode light. Further, when the phase of the other mode light matches the phase of the one mode light, post-merging waveguide 33 of merge waveguide 30 emits, from output port 2, mode light that is same as the mode light incident on input port 1, by superposing the one equally-divided mode light on the other equally-divided mode light.

Here, in optical mode switch 100 shown in FIG. 11(a), unnecessary mode components will be generated when mode light incident on input port 1 is switched to another mode light or subjected to non-conversion. Therefore, it is necessary to suppress the ratio of unnecessary mode component to necessary mode component (inter-mode crosstalk).

Figure 12A:
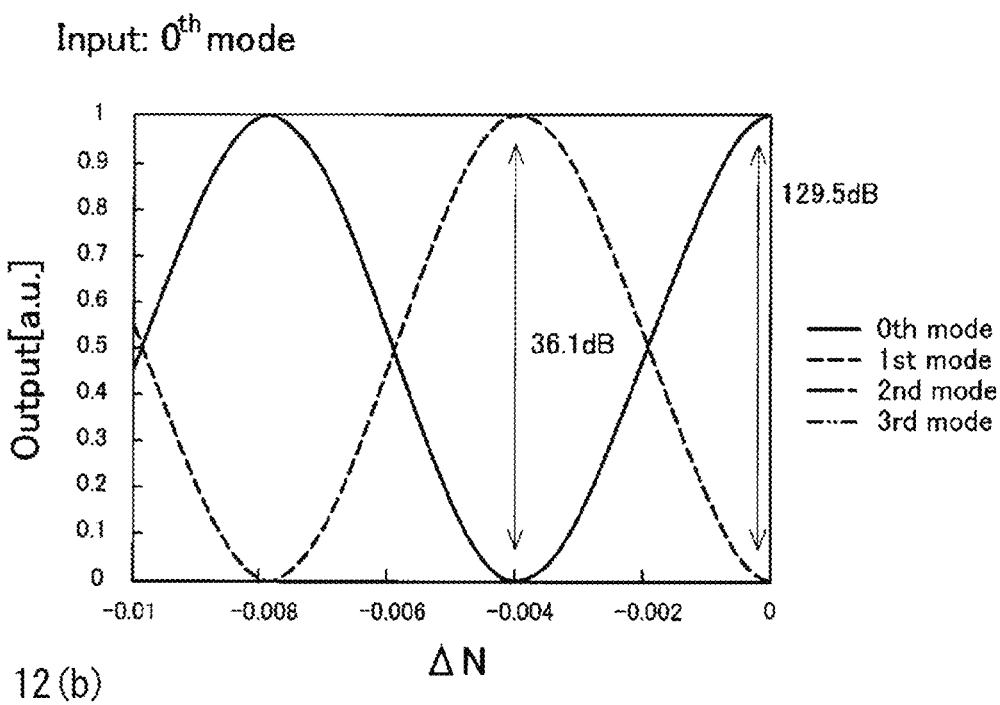
FIG. 12(a) and FIG. 12(b) are graphs showing the relationship between amount of refractive index change ΔN in a refractive index changing region shown in FIG. 11(a) and output of zero-order mode light and first-order mode light, in particular, FIG. 12(a) being a graph showing the relationship between the amount of refractive index change ΔN and the output when the zero-order mode light is inputted, and FIG. 12(b) being a graph showing the relationship between the amount of refractive index change ΔN and the output when the first-order mode light is inputted.
Figure 12B:
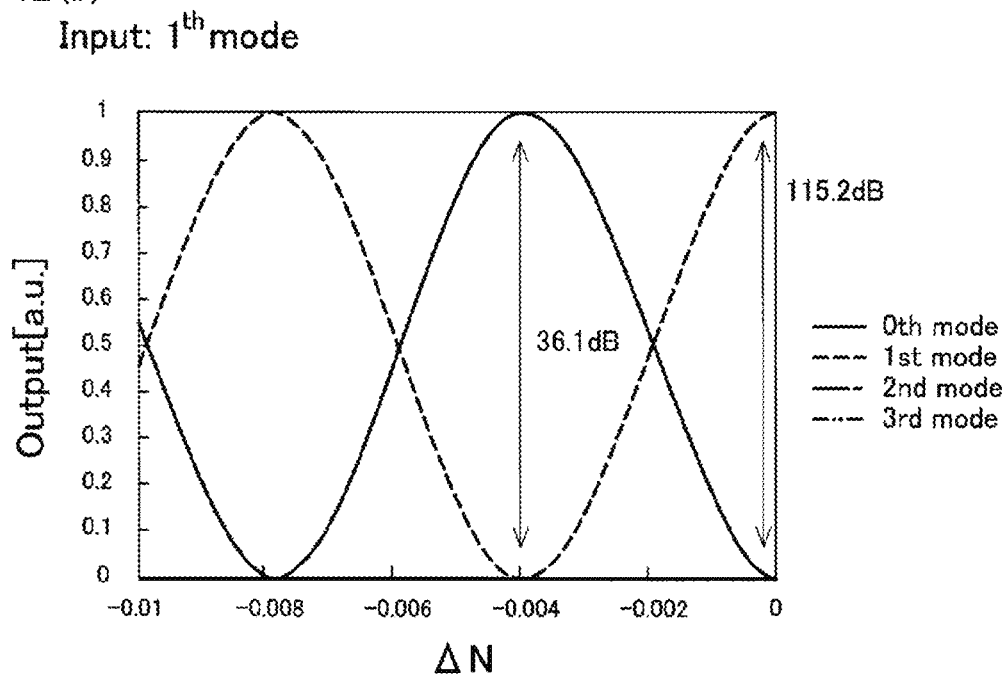

Therefore, it can be considered to provide refractive index changing region 3 of refractive index changing means 8 with appropriate amount of refractive index change ΔN, based on the relationship, shown in FIG. 12(a) and FIG. 12(b), between amount of refractive index change ΔN in refractive index changing region 3 of refractive index changing means 8 arranged in second linear waveguide 12 and output of zero-order mode light or first-order mode light to input of zero-order mode light or first-order mode light. In addition, FIG. 12(a) and FIG. 12(b) show the zero-order mode light by a solid line, the first-order mode light by a broken line, the second-order mode light by a chain line, and the third-order mode light by a two-dot chain line. The second-order mode light and the third-order mode light overlap the horizontal axis where output is zero.

Figure 13A:
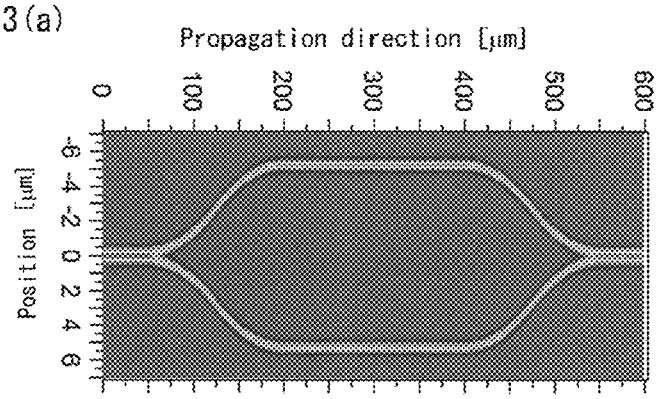
FIG. 13(a) to FIG. 13(d) show an operational simulation of the optical mode switch shown in FIG. 11(a) to FIG. 11(c), in particular, FIG. 13(a) being an explanatory drawing showing an optical field in which the zero-order mode light is inputted and the amount of refractive index change ΔN is set to 0, FIG. 13(b) being an explanatory drawing showing an optical field in which the zero-order mode light is inputted and the amount of refractive index change ΔN is set to −0.0039, FIG. 13(c) being an explanatory drawing showing an optical field in which the first-order mode light is inputted and the amount of refractive index change ΔN is set to 0, and FIG. 13(d) being an explanatory drawing showing an optical field in which the first-order mode light is inputted and the amount of refractive index change ΔN is set to −0.0039.

That is, when mode light incident on input port 1 is zero-order mode light, optical mode switch 100 can match the phase of the equally-divided mode light propagating through first linear waveguide 11 and the phase of the equally-divided mode light propagating through second linear waveguide 12 and superpose the resultant mode lights, by setting the amount of refractive index change ΔN in refractive index changing region 3 of refractive index changing means 8 to 0, as shown in FIG. 12(a), and thereby emit the zero-order mode light from output port 2 via post-merging waveguide 33 of merge waveguide 30, as shown in FIG. 13(a). In this case, the inter-mode crosstalk, which is the ratio of unnecessary mode component (the first-order mode light) to necessary mode component (the zero-order mode light), is 129.5 dB, as shown in FIG. 12(a).

Figure 13B:
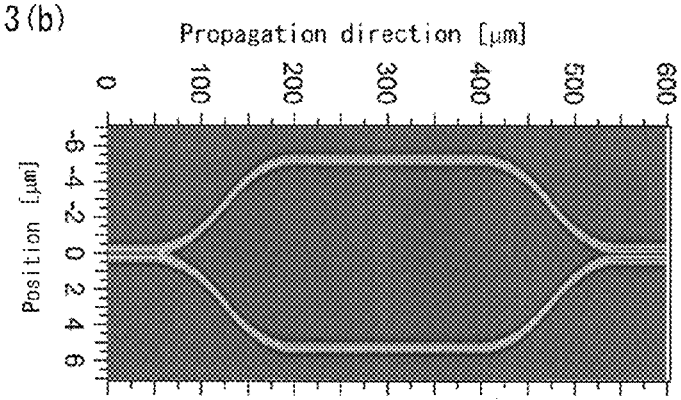

Also, when mode light incident on input port 1 is zero-order mode light, optical mode switch 100 can make the phase of the equally-divided mode light propagating through second linear waveguide 12 different from the phase of the equally-divided mode light propagating through first linear waveguide 11 by π [rad] and superpose the resultant mode lights, by setting the amount of refractive index change ΔN in refractive index changing region 3 of refractive index changing means 8 to −0.0039, as shown in FIG. 12(a), and thereby emit the first-order mode light from output port 2 via post-merging waveguide 33 of merge waveguide 30, as shown in FIG. 13(b). In this case, the inter-mode crosstalk, which is the ratio of unnecessary mode component (the zero-order mode light) to necessary mode component (the first-order mode light), is 36.1 dB, as shown in FIG. 12(a).

Figure 13C:
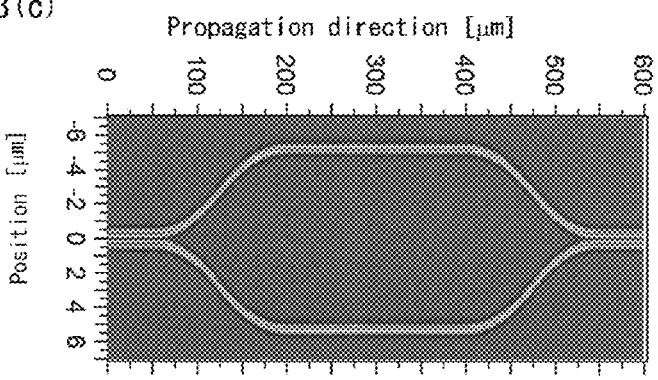
Figure 13D:
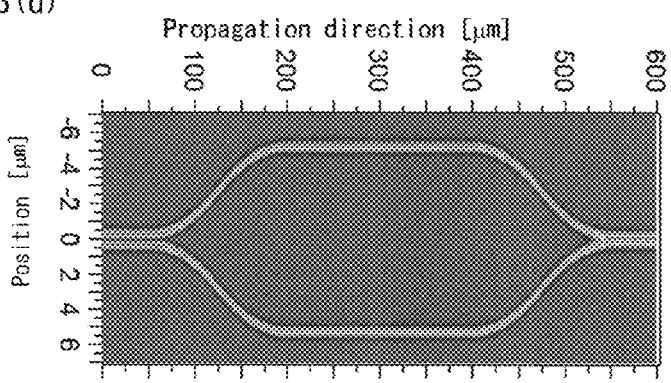

Similarly, when mode light incident on input port 1 is first-order mode light, optical mode switch 100 can match the phase of the equally-divided mode light propagating through first linear waveguide 11 and the phase of the equally-divided mode light propagating through second linear waveguide 12 and superpose the resultant mode lights, by setting the amount of refractive index change ΔN in refractive index changing region 3 of refractive index changing means 8 to 0, as shown in FIG. 12(b), and thereby emit the first-order mode light from output port 2 via post-merging waveguide 33 of merge waveguide 30, as shown in FIG. 13(c). In this case, the inter-mode crosstalk, which is the ratio of unnecessary mode component (the zero-order mode light) to necessary mode component (the first-order mode light), is 115.2 dB, as shown in FIG. 12(b).

Also, when mode light incident on input port 1 is first-order mode light, optical mode switch 100 can make the phase of the equally-divided mode light propagating through second linear waveguide 12 different from the phase of the equally-divided mode light propagating through first linear waveguide 11 by π [rad] and superpose the resultant mode lights, by setting the amount of refractive index change ΔN in refractive index changing region 3 of refractive index changing means 8 to −0.0039, as shown in FIG. 12(*b*), and thereby emit the zero-order mode light from output port 2 via post-merging waveguide 33 of merge waveguide 30, as shown in FIG. 13(*d*). In this case, the inter-mode crosstalk, which is the ratio of unnecessary mode component (the first-order mode light) to necessary mode component (the zero-order mode light), is 36.1 dB, as shown in FIG. 12(*b*).

Incidentally, this second embodiment differs from the first embodiment only in that incident mode light is divided into two by symmetric Y-branch waveguide 20 instead of utilizing mode sorting by asymmetric Y-branch waveguide 20 and that refractive index changing means 8 is arranged in second straight waveguide 12. The second embodiment can achieve the same action/effect as the first embodiment except for action/effect by symmetric Y-branch waveguide 20 and refractive index changing means 8.

Further, the present embodiment has described that refractive index changing means 8 is arranged in second linear waveguide 12 of two waveguides 10 (first linear waveguide 11 and second linear waveguide 12) that are juxtaposed between input port 1 and output port 2. As long as it is arranged in at least one of two waveguides 10 that are juxtaposed between input port 1 and output port 2, it may be arranged in first linear waveguide 11 instead of second linear waveguide 12, or arranged in first linear waveguide 11 and second linear waveguide 12.

Further, when refractive index changing means 8 is arranged in first linear waveguide 11 and second linear waveguide 12, a voltage will be applied to first electrode 4*a* and second electrode 4*b* in refractive index changing means 8 of any one of first linear waveguide 11 and second linear waveguide 12, in order to emit, from output port 2, different mode light with regard to the mode light incident on input port 1. In order to emit, from output port 2, the same mode light with regard to the mode light incident on input port 1, a voltage will be applied to first electrode 4*a* and second electrode 4*b* in refractive index changing means 8 of neither first linear waveguide 11 nor second linear waveguide 12, or will be applied to first electrode 4*a* and second electrode 4*b* in refractive index changing means 8 of both first linear waveguide 11 and second linear waveguide 12.

Third Embodiment of the Present Invention

Figure 14A:
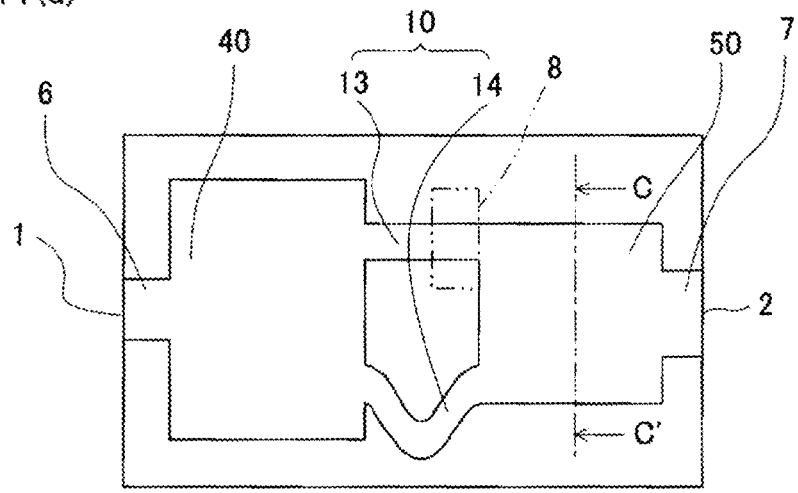
FIG. 14(a) is a plan view showing an example of a schematic configuration of an optical mode switch according to the third embodiment.
Figure 14B:
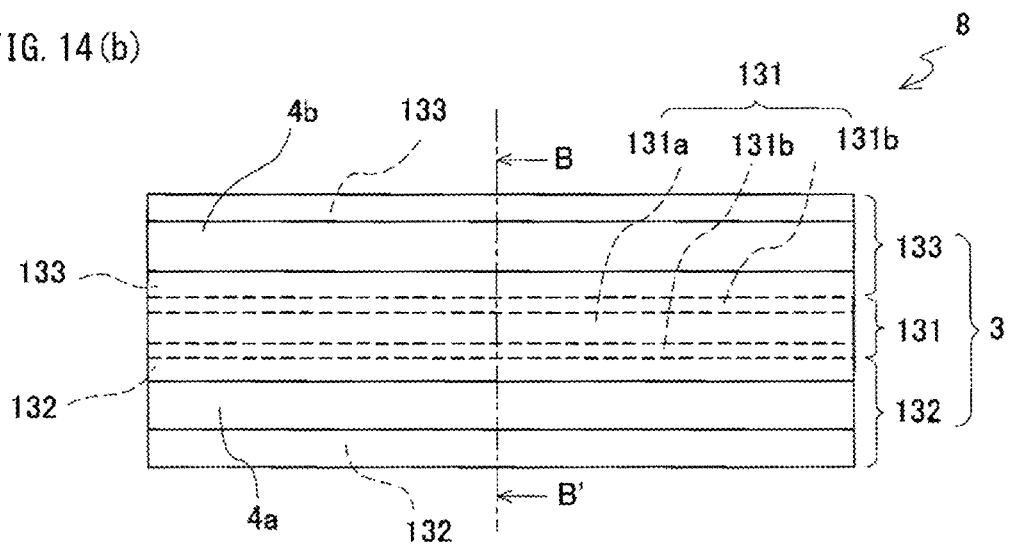
FIG. 14(b) is an enlarged view of a refractive index changing means in a third linear waveguide shown in FIG. 14(a)
Figure 14C:
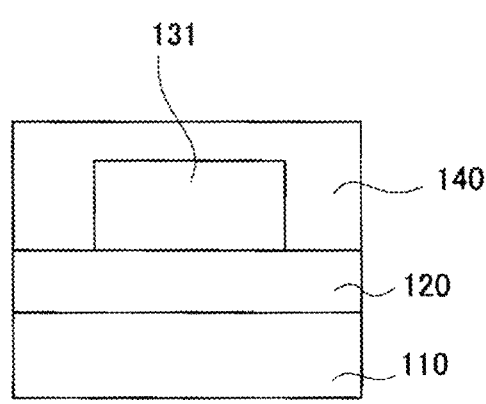
FIG. 14(c) is a cross-sectional view of a 2×1 type MMI waveguide shown in FIG. 14(a) taken along the line C-C'.

FIG. 14(*a*) is a plan view showing an example of a schematic configuration of an optical mode switch according to the third embodiment, FIG. 14(*b*) is an enlarged view of a refractive index changing means in a third linear waveguide shown in FIG. 14(*a*), and FIG. 14(*c*) is a cross-sectional view of the optical mode switch shown in FIG. 14(*a*) taken along the line C-C'. In FIG. 14(*a*) to FIG. 14(*c*), the same reference numerals as in FIG. 1(*a*) to FIG. 8(*f*) and FIG. 11(*a*) to FIG. 11(*c*) show the same or corresponding parts, and description thereof will be omitted.

Optical mode switch 100 according to the present embodiment includes: 1×2 type multi-mode interference (MMI) waveguide (hereinafter referred to as "MMI waveguide") 40 that is arranged between input port 1 and two waveguides 10; 2×1 type MMI waveguide 50 that is arranged between output port 2 and two waveguides 10; input waveguide 6, to one end of which 1×2 type MMI waveguide 40 is connected, and another end of which is made an incident surface (input port 1); and output waveguide 7, to one end of which 2×1 type MMI waveguide 50 is connected, and another end of which is made an output surface (output port 2).

In particular, two waveguides 10 according to the present embodiment is comprised of: third linear waveguide 13 comprising a linear region; and curved waveguide 14 comprising a curved region. The waveguide length of third linear waveguide 13 is made different from the waveguide length of curve-shaped waveguide 14. Specifically, third linear waveguide 13 has the waveguide length of 165 μm and the waveguide width of 4 μm. Further, curved waveguide 14 has a structure in which substantially S-shaped curvilinear regions each having the waveguide width of 4 μm and the curvature radius of 100 μm are combined in the middle thereof.

Further, refractive index changing means 8 according to the present embodiment is arranged in third linear waveguide 13 of two waveguides 10 (third linear waveguide 13 and curved waveguide 14) that are juxtaposed between input port 1 and output port 2.

Furthermore, 1×2 type MMI waveguide 40 according to the present embodiment has a substantially rectangular interference region having the waveguide length of 420 μm (≈3Lc/8, Lc: waveguide length of clad) and the waveguide width of 20 μm. Also, 2×1 type MMI waveguide 50 according to the present embodiment has a substantially rectangular interference region having the waveguide length of 415 μm (≈3Lc'/4, Lc': waveguide length of clad), the waveguide width is 14 μm.

In addition, MMI waveguides can be designed using known techniques. For example, 1×2 type MMI waveguide 40 and 2×1 type MMI waveguide 50 can be designed as follows, based on MMI theory.

Formula of waveguide length ($L_\pi$) of MMI waveguide can be expressed as the following Formula 1. Here, in Formula 1, $W_e$ denotes effective waveguide width, W1 denotes width of MMI region, Nr denotes refractive index of waveguide, Nc denotes refractive index of clad, and $\lambda_0$ denotes wavelength of incident light. Furthermore, σ denotes σ=0 in TE mode, and denotes σ=1 in TM mode.

$$W_e = W_1 + (\lambda_0/\pi)(Nc/Nr)^{2\sigma}(Nr^2 - Nc^2)^{-1/2}$$

$$L_\pi = 4Nr W_e^2/3\lambda_0 \qquad \text{Formula 1}$$

Furthermore, MMI waveguide can operate as a 1×N type waveguide when it is expressed by the following Formula 2. Further, MMI waveguide can operate as an M×N type waveguide when it is expressed by the following Formula 3. Here, M and N are positive integers. M on the input side can be 1 and N on the output side can be set to 2 or more. L shown in Formula 2 and Formula 3 denote length of multi-mode interference waveguide.

$$L = (3/4N)L_\pi (N \text{ is a positive integer}) \qquad \text{Formula 2}$$

$$L = (3/N)L_\pi (N \text{ is a positive integer}) \qquad \text{Formula 3}$$

In addition, 1×2 type MMI waveguide 40 and 2×1 type MMI waveguide 50 according to the present embodiment have been designed on the assumption that incident light wavelength $\lambda_0$ is 1.55 μm, refractive index Nc of clad is 1.5, and refractive index Nr of waveguide is 3.22.

Input waveguide 6 according to the present embodiment is a linear waveguide in which the waveguide length is 50

μm and the waveguide width is 4 μm, and is connected substantially to the middle of the side of 1×2 type MMI waveguide 40 input side. Output waveguide 7 according to the present embodiment is a linear waveguide in which the waveguide length is 50 μm and the waveguide width is 8 μm, and is connected substantially to the middle of the side of 2×1 type MMI waveguide 50 output side.

The layer structure of input waveguide 6, output waveguides 7, 1×2 type MMI waveguide 40, 2×1 type MMI waveguide 50, third linear waveguide 13 (except for refractive index changing means 8), and curved waveguide 14 according to the present embodiment is the same as the layer structure (see FIG. 2(*d*)) of waveguide 10, Y-branch waveguide 20, and merge waveguide 30 (except for refractive index changing means 8) as previously described in the first embodiment, both layer structures being different only in waveguide width (width of intrinsic semiconductor region 131).

Next, the operation of optical mode switch 100 will be described with reference to FIG. 14(*a*). Mode light incident on input port 1 of optical mode switch 100 propagates through input waveguide 6 and enters 1×2 type MMI waveguide 40.

Then, mode light incident on 1×2 type MMI waveguide 40 is equally divided into two and branched. One mode light after equal division propagates through third linear waveguide 13 (refractive index changing region 3 of refractive index changing means 8) and enters 2×1 type MMI waveguide 50. Another mode light after equal division propagates through curved waveguide 14 and enters 2×1 type MMI waveguide 50 while out of phase with the one equally-divided mode light by π.

In this state, when a voltage is applied to first electrode 4*a* and second electrode 4*b* of optical mode switch 100, forward bias is applied to the pin junction composed of p-type semiconductor region 132, intrinsic semiconductor region 131, and n-type semiconductor region 133. This will cause carriers to be supplied from p-type semiconductor region 132 and n-type semiconductor region 133 to rib portion 131*a* of intrinsic semiconductor region 131. The supplied carries accumulate in rib portion 131*a*. By the plasma effect of the carriers, it is possible to change the phase of the other mode light by π [rad] with respect to the phase of the one mode light. That is, with respect to the phase difference π between one mode light equally-divided propagating through third linear waveguide 13 and another mode light equally-divided propagating through curved waveguide 14, which is caused by the structure having different waveguide lengths of two waveguides 10, optical mode switch 100 can match phases between the one mode light and the other mode light by applying a voltage to first electrode 4*a* and second electrode 4*b*.

Then, when the phase of the other mode light is different from the phase of the one mode light by π [rad] (when a voltage is not applied to first electrode 4*a* and second electrode 4*b*), 2×1 type MMI waveguide 50 emits, from output port 2, mode light that is different from the mode light incident on input port 1, by superposing the one equally-divided mode light on the other equally-divided mode light. Further, when the phase of the other mode light matches the phase of the one mode light (when a voltage is applied to first electrode 4*a* and second electrode 4*b*), 2×1 type MMI waveguide 50 emits, from output port 2, mode light that is same as the mode light incident on input port 1, by superposing the one equally-divided mode light on the other equally-divided mode light.

Incidentally, this third embodiment differs from the first embodiment and the second embodiment only in that it includes 1×2 type MMI waveguide 40 (input waveguide 6) and 2×1 type MMI waveguide 50 (output waveguide 7) instead of Y-branch waveguide 20 and merge waveguide 30. The third embodiment can achieve the same action/effect as the first embodiment and the second embodiment except for action/effect by 1×2 type MMI waveguide 40 and 2×1 type MMI waveguide 50.

Further, the present embodiment has described that refractive index changing means 8 is arranged in third linear waveguide 13 of two waveguides 10 (third linear waveguide 13 and curved waveguide 14) that are juxtaposed between input port 1 and output port 2. As long as it is arranged in at least one of two waveguides 10 that are juxtaposed between input port 1 and output port 2, it may be arranged in curved waveguide 14 instead of third linear waveguide 13, or arranged in third linear waveguide 13 and curved waveguide 14.

Further, when refractive index changing means 8 is arranged in third linear waveguide 13 and curved waveguide 14, a voltage will be applied to first electrode 4*a* and second electrode 4*b* in refractive index changing means 8 of any one of third linear waveguide 13 and curved waveguide 14, in order to emit, from output port 2, the same mode light with regard to the mode light incident on input port 1. In order to emit, from output port 2, different mode light with regard to the mode light incident on input port 1, a voltage will be applied to first electrode 4*a* and second electrode 4*b* in refractive index changing means 8 of neither third linear waveguide 13 nor curved waveguide 14, or will be applied to first electrode 4*a* and second electrode 4*b* in refractive index changing means 8 of both third linear waveguide 13 and curved waveguide 14.

Also, two waveguides 10 according to the present embodiment provide different waveguide lengths for each other, which causes the phase difference π between one mode light equally-divided propagating through third linear waveguide 13 and another mode light equally-divided propagating through curved waveguide 14. However, without varying the waveguide length of two waveguides 10, curved waveguide 14 may be a linear waveguide having a waveguide length same as the waveguide length of third linear waveguide 13, for example. However, since optical mode switch 100 according to the present embodiment emits mode light incident on input port 1, as different mode light, from output port 2 (that is, switches the incident mode light into the same mode light or different mode light), refractive index changing means 8 needs to be arranged in at least one of two waveguides 10.

Fourth Embodiment of the Present Invention

Figure 15A:
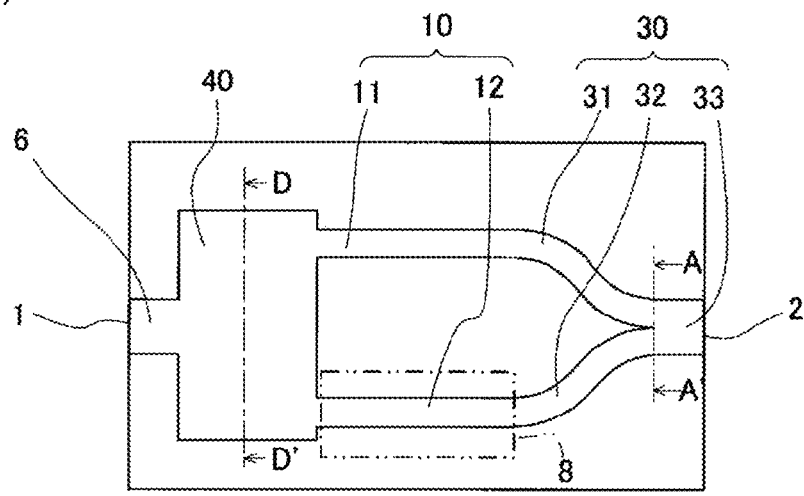
FIG. 15(a) is a plan view showing an example of a schematic configuration of an optical mode switch according to the fourth embodiment.
Figure 15B:
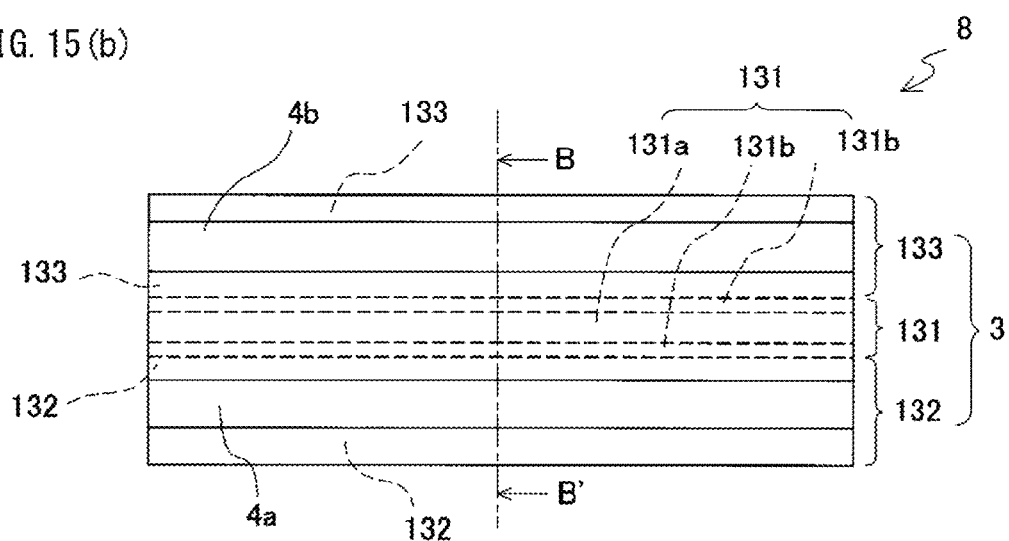
FIG. 15(b) is an enlarged view of a refractive index changing means in a second linear waveguide shown in FIG. 15(a)
Figure 15C:
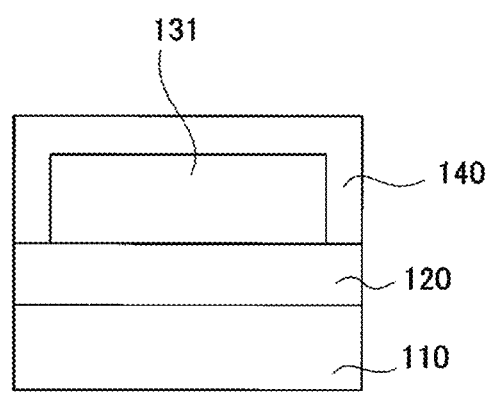
FIG. 15(c) is a cross-sectional view of a 1×2 type MMI waveguide shown in FIG. 15(a) taken along the line D-D'.

FIG. 15(*a*) is a plan view showing an example of a schematic configuration of an optical mode switch according to the fourth embodiment, FIG. 15(*b*) is an enlarged view of a refractive index changing means in a second linear waveguide shown in FIG. 15(*a*), and FIG. 15(*c*) is a cross-sectional view of a 1×2 type MMI waveguide shown in FIG. 15(*a*) taken along the line D-D'. In FIG. 15(*a*) to FIG. 15(*c*), the same reference numerals as in FIG. 1(*a*) to FIG. 14(*c*) show the same or corresponding parts, and description thereof will be omitted.

Mode switch means of the present embodiment includes two waveguides 10 (first linear waveguide 11 and second linear waveguide 12) that are arranged between input port 1 and output port 2. An optical branch waveguide according to the present embodiment is 1×2 type multi-mode interference waveguide 40 that is arranged between input port 1 and two waveguides 10 (first linear waveguide 11 and second linear waveguide 12). An optical multiplexing waveguide according to the present embodiment is merge waveguide 30 that is arranged between output port 2 and two waveguides 10 (first linear waveguide 11 and second linear waveguide 12). In addition, refractive index changing means 8 is arranged in two waveguides 10 (first linear waveguide 11 and second linear waveguide 12) or a waveguide (first merging waveguide 31 and second merging waveguide 32). Refractive index changing means 8 according to the present embodiment is arranged in second linear waveguide 12.

Next, the operation of optical mode switch 100 will be described with reference to FIG. 15(a). Mode light incident on input port 1 of optical mode switch 100 propagates through input waveguide 6 and enters 1×2 type MMI waveguide 40.

Then, mode light incident on 1×2 type MMI waveguide 40 is equally divided into two and branched. One mode light after equal division propagates through first linear waveguide 11 and enters first merging waveguide 31 of merge waveguide 30. Another mode light after equal division propagates through second linear waveguide 12 (refractive index changing region 3 of refractive index changing means 8) and enters second merging waveguide 32 of merge waveguide 30.

In this state, when a voltage is applied to first electrode 4a and second electrode 4b of optical mode switch 100, forward bias is applied to the pin junction composed of p-type semiconductor region 132, intrinsic semiconductor region 131, and n-type semiconductor region 133. This will cause carriers to be supplied from p-type semiconductor region 132 and n-type semiconductor region 133 to rib portion 131a of intrinsic semiconductor region 131. The supplied carries accumulate in rib portion 131a. By the plasma effect of the carriers, it is possible to change the phase of the other mode light by $\pi$ [rad] with respect to the phase of the one mode light.

Then, when the phase of the other mode light is different from the phase of the one mode light by $\pi$ [rad] (when a voltage is applied to first electrode 4a and second electrode 4b), post-merging waveguide 33 of merge waveguide 30 emits, from output port 2, mode light that is different from the mode light incident on input port 1, by superposing the one mode light after equal division on the other mode light after equal division. Further, when the phase of the other mode light matches the phase of the one mode light (when a voltage is not applied to first electrode 4a and second electrode 4b), post-merging waveguide 33 of merge waveguide 30 emits, from output port 2, mode light that is same as the mode light incident on input port 1, by superposing the one mode light after equal division on the other mode light after equal division.

Incidentally, this fourth embodiment differs from the second embodiment only in that it includes input waveguide 6, which has a waveguide width same as the waveguide width of pre-branching waveguide 23, and 1×2 type MMI waveguide 40, instead of Y-branch waveguide 20. The fourth embodiment can achieve the same action/effect as the second embodiment except for action/effect by 1×2 type MMI waveguide 40.

Further, the present embodiment has described that refractive index changing means 8 is arranged in second linear waveguide 12 of two waveguides 10 (first linear waveguide 11 and second linear waveguide 12) that are juxtaposed between input port 1 and output port 2. As long as it is arranged in at least one of two waveguides 10 that are juxtaposed between input port 1 and output port 2, it may be arranged in first linear waveguide 11 instead of second linear waveguide 12, or arranged in first linear waveguide 11 and second linear waveguide 12.

Further, optical mode switch 100 according to the present embodiment may include output waveguide 7, which has the same waveguide width as pre-branching waveguide 23, and 2×1 type MMI waveguide 50, instead of merge waveguide 30, in optical mode switch 100 according to the second embodiment. Further, optical mode switch 100 according to the present embodiment may include input waveguide 6, which has the same waveguide width as pre-branching waveguide 23, and 1×2 type MMI waveguide 40, instead of Y-branch waveguide 20, and output waveguide 7, which has the same waveguide width as post-merging waveguide 33, and 2×1 type MMI waveguide 50, instead of merge waveguide 30, in optical mode switch 100 according to the second embodiment.

Fifth Embodiment of the Present Invention

Figure 16A:
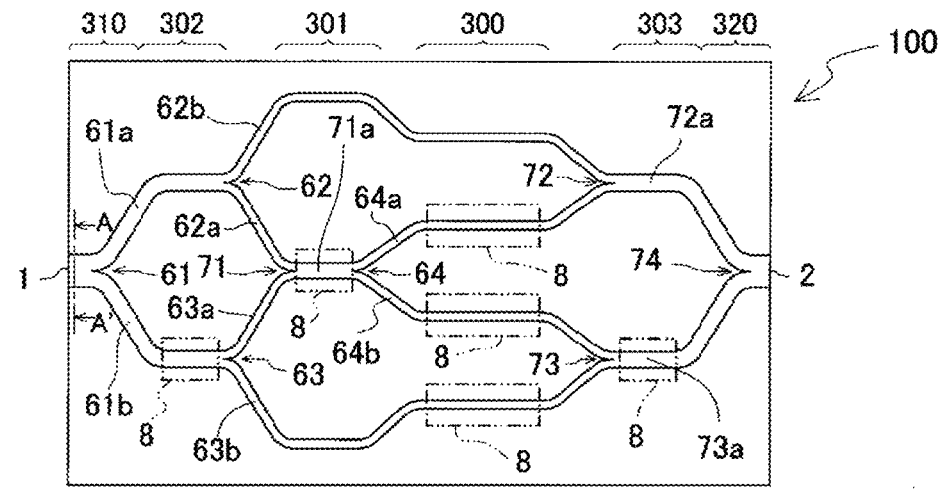
FIG. 16(a) is a plan view showing an example of a schematic configuration of an optical mode switch according to the fifth embodiment.
Figure 16B:
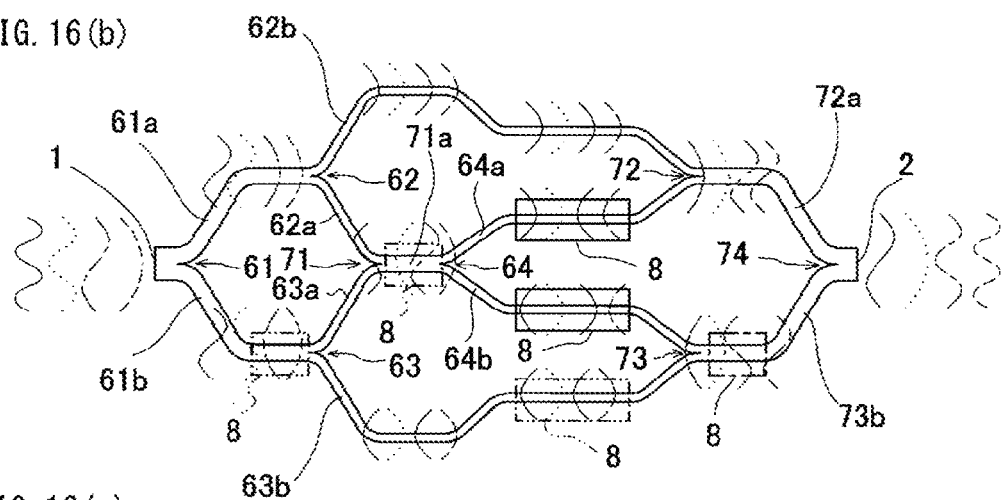
FIG. 16(b) is an illustration for explaining an example of a mode switching of the optical mode switch shown in FIG. 16(a)
Figure 16C:
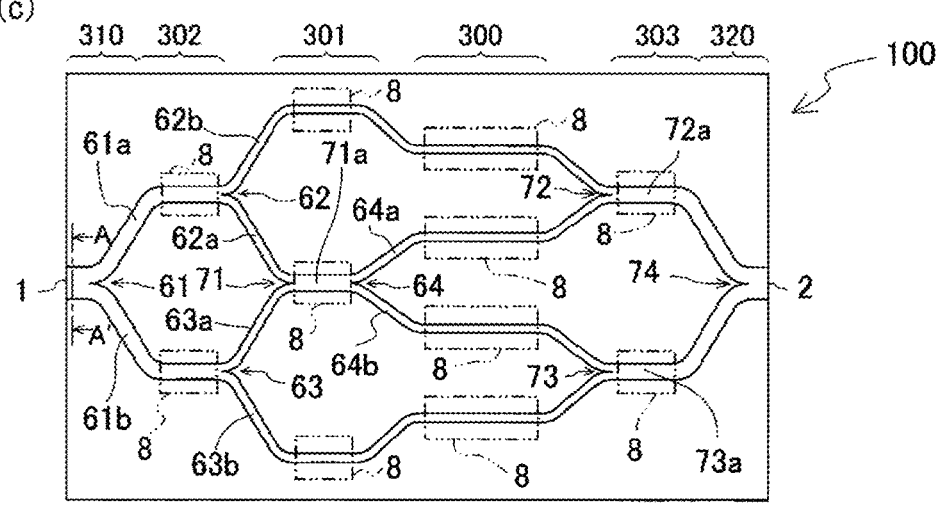
FIG. 16(c) is a plan view showing another example of a schematic configuration of an optical mode switch according to the fifth embodiment.
Figures 17A, 17B, 17C, 17D:
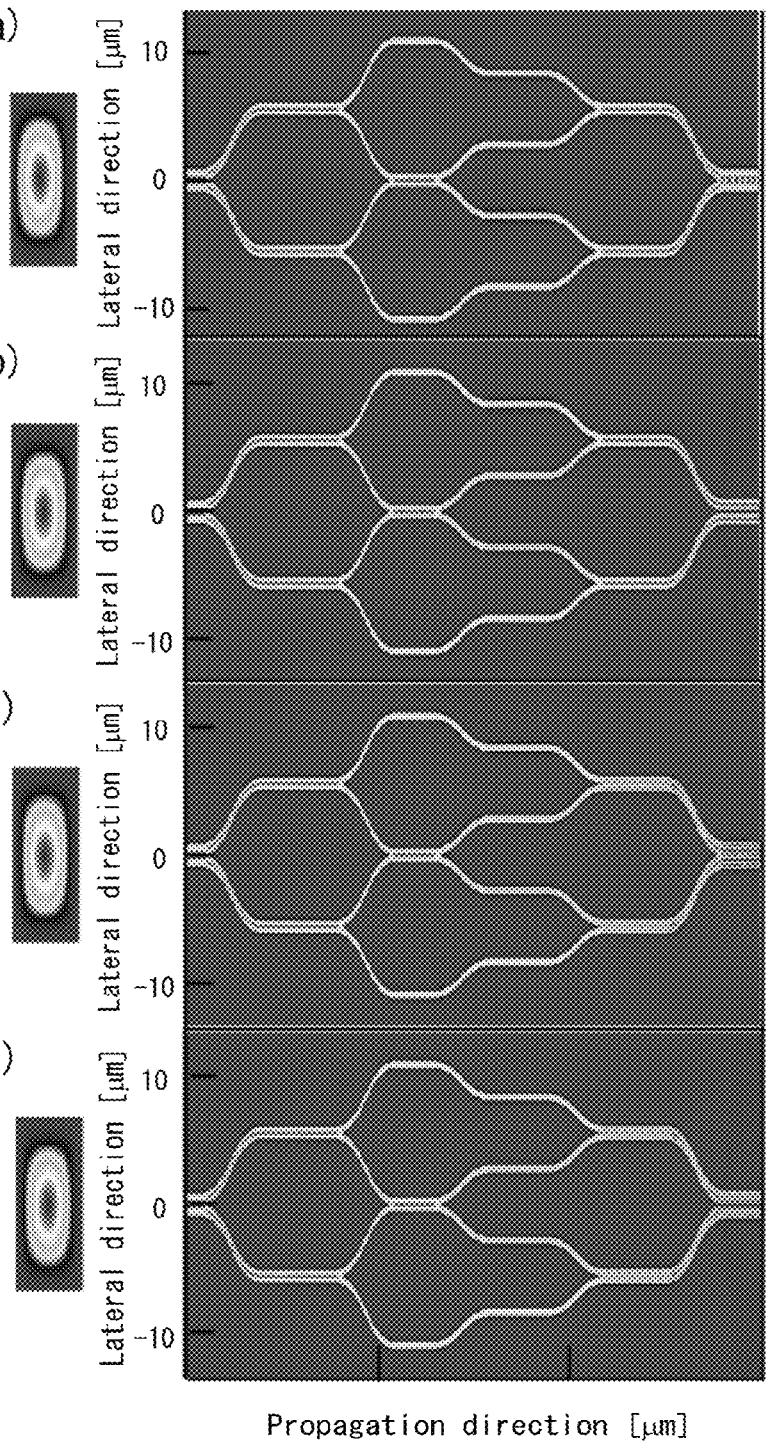
FIG. 17(a) to FIG. 17(d) are explanatory drawings showing a state (optical field) in which light is switched from zero-order mode to another mode according to a beam propagation method simulation in the optical mode switch shown in FIG. 16(a), in particular, FIG. 17(a) being an explanatory drawing showing an optical field in which the zero-order mode light is inputted and zero-order mode light is outputted, FIG. 17(b) being an explanatory drawing showing an optical field in which the zero-order mode light is inputted and first-order mode light is outputted, FIG. 17(c) being an explanatory drawing showing an optical field in which the zero-order mode light is inputted and second-order mode light is outputted, and FIG. 17(d) being an explanatory drawing showing an optical field in which the zero-order mode light is inputted and third-order mode light is outputted.

FIG. 16(a) is a plan view showing an example of a schematic configuration of an optical mode switch according to the fifth embodiment, FIG. 16(b) is an illustration for explaining an example of a mode switching of the optical mode switch shown in FIG. 16(a), and FIG. 16(c) is a plan view showing another example of a schematic configuration of an optical mode switch according to the fifth embodiment. FIG. 17(a) to FIG. 17(d) are explanatory drawings showing a state (optical field) in which light is switched from zero-order mode to another mode according to a beam propagation method simulation in the optical mode switch shown in FIG. 16(a), in particular, FIG. 17(a) is an explanatory drawing showing an optical field in which the zero-order mode light is inputted and zero-order mode light is outputted, FIG. 17(b) is an explanatory drawing showing an optical field in which the zero-order mode light is inputted and first-order mode light is outputted, FIG. 17(c) is an explanatory drawing showing an optical field in which the zero-order mode light is inputted and second-order mode light is outputted, and FIG. 17(d) is an explanatory drawing showing an optical field in which the zero-order mode light is inputted and third-order mode light is outputted. In FIG. 16(a) to FIG. 17(d), the same reference numerals as in FIG. 1(a) to FIG. 15(c) show the same or corresponding parts, and description thereof will be omitted.

In the above-mentioned second embodiment, it has described optical mode switch 100 that corresponds to light having two modes (zero-order mode and first-order mode) and switches zero-order mode light or first-order mode light to zero-order mode light or first-order mode light. In contrast, the present embodiment will extend the function of optical mode switch 100, and describe optical mode switch 100 that corresponds to light having four modes (zero-order mode, first-order mode, second-order mode, and fourth-order mode) and switches zero-order mode light, first-order mode light, second-order mode light, or fourth-order mode light to zero-order mode light, first-order mode light, second-order mode light, or fourth-order mode light.

Mode switch means according to the present embodiment includes, as shown in FIG. 16(a): a Y-branch waveguide (hereinafter referred to as "first Y-branch waveguide 61") that divides mode light incident from input port 1 into two; a Y-branch waveguide (hereinafter referred to as "second Y-branch waveguide 62") that divides mode light propagating through one branched waveguide 61a of first Y-branch waveguide 61 into two; a Y-branch waveguide (hereinafter referred to as "third Y-branch waveguide 63") that divides mode light propagating through another branched waveguide 61*b* of first Y-branch waveguide 61 into two; and a Y-branch waveguide (hereinafter referred to as "fourth Y-branch waveguide 64") that divides mode light incident from first merge waveguide 71, which will be described below, into two.

Further, mode switch means according to the present embodiment includes: a merge waveguide (hereinafter referred to as "first merge waveguide 71") that couples mode light propagating through one branched waveguide 62*a* of second Y-branch waveguide 62 and mode light propagating through one branched waveguide 63*a* of third Y-branch waveguide 63; a merge waveguide (hereinafter referred to as "second merge waveguide 72") that couples mode light propagating through another branched waveguide 62*b* of second Y-branch waveguide 62 and mode light propagating through one branched waveguide 64*a* of fourth Y-branch waveguide 64; a merge waveguide (hereinafter referred to as "third merge waveguide 73") that couples mode light propagating through another branched waveguide 63*b* of third Y-branch waveguide 63 and mode light propagating through another branched waveguide 64*b* of fourth Y-branch waveguide 64; and a merge waveguide (hereinafter referred to as "fourth merge waveguide 74") that couples mode light incident from second merge waveguide 72 and mode light incident from third merge waveguide 73 to output the coupled mode light from output port 2.

Refractive index changing means 8 according to the present embodiment is arranged in: another branched waveguide 61*b* of first Y-branch waveguide 61; waveguide 71*a* between first merge waveguide 71 and fourth Y-branch waveguide 64; one branched waveguide 64*a* and another branched waveguide 64*b* of fourth Y-branch waveguide 64; another branched waveguide 63*b* of third Y-branch waveguide 63; and waveguide 73*a* between third merge waveguide 73 and fourth merge waveguide 74, as shown in FIG. 16(*a*).

In addition, refractive index changing means 8 of the present embodiment is a phase inversion region (π phase shift region) that inverts (shifts by π "rad") the phase of mode light by applying a voltage to first electrode 4*a* and second electrode 4*b*. In particular, another branched waveguide 61*b* of first Y-branch waveguide 61, waveguide 71*a* between first merge waveguide 71 and fourth Y-branch waveguide 64, and waveguide 73*a* between third merge waveguide 73 and fourth merge waveguide 74 are waveguides through which mode light of first-order mode or less (first-order mode light and zero-order mode light) propagates, as described below. Refractive index changing means 8 arranged in waveguide 61*b*, waveguide 71*a*, and waveguide 73*a* will be a first-order mode phase inversion region. The term first-order mode phase inversion region here means a region that makes a state in which the phase of first-order mode light is inverted while the phase of zero-order mode light remains unchanged without inversion, when the refractive index in this region has been changed by injecting a current therein, by utilizing the fact that the propagation constants are different between zero-order mode light and first-order mode light, in an optical waveguide through which mode light of first-order mode or less penetrates. Further, one branched waveguide 64*a* and another branched waveguide 64*b* of fourth Y-branch waveguide 64, and another branched waveguide 63*b* of third Y-branch waveguide 63 are waveguides through which zero-order mode light propagates, as described below. Refractive index changing means 8 arranged in waveguide 64*a*, waveguide 64*b*, and waveguide 63*b* will be a zero-order mode phase inversion region.

In addition, the waveguide width after dividing by the Y-branch waveguides according to the present embodiment (first Y-branch waveguide 61, second Y-branch waveguide 62, third Y-branch waveguide 63, and fourth Y-branch waveguide 64) is ½ times wider than the waveguide width before dividing. The waveguide width after coupling by the merge waveguides (first merge waveguide 71, second merge waveguide 72, third merge waveguide 73, and fourth merge waveguide 74) is two times wider than the waveguide width before coupling.

That is, when the waveguide width of input port 1 and output port 2 is denoted by "W", the waveguide width of one branched waveguide 61*a* and another branched waveguide 61*b* of first Y-branch waveguide 61 is denoted by "W/2"; the waveguide width of one branched waveguide 62*a* and another branched waveguide 62*b* of second Y-branch waveguide 62 is denoted by "W/4"; the waveguide width of one branched waveguide 63*a* and another branched waveguide 63*b* of third Y-branch waveguide 63 is denoted by "W/4"; the waveguide width of waveguide 71*a* between first merge waveguide 71 and fourth Y-branch waveguide 64 is denoted by "W/2"; the waveguide width of one branched waveguide 64*a* and another branched waveguide 64*b* of fourth Y-branch waveguide 64 is denoted by "W/4"; the waveguide 72*a* between second merge waveguide 72 and fourth merge waveguide 74 denoted by "W2"; and the waveguide width of waveguide 73*a* between third merge waveguide 73 and fourth merge waveguide 74 is denoted by "W/2".

Thus, it is desirable to set the waveguide width after dividing by the Y-branch waveguides to be ½ times wider than the waveguide width before dividing, to set the waveguide width after coupling by the merge waveguides to be two times wider than the waveguide width before coupling, and then to make refractive index changing means 8 into symmetrical and simple structures, in order not to cause excessive loss due to the dividing by the Y-branch waveguides and the coupling by the merge waveguides.

Next, the operation of optical mode switch 100 will be described with reference to FIG. 16(*a*) to FIG. 16(*c*) and Table 1. In addition, in optical mode switch 100 according to the present embodiment, since four kinds of mode light: zero-order mode light, first-order mode light, second-order mode light, and third-order mode light enter input port 1 as input modes, 24 patterns, which is the factorial of four (4!), can be considered as the order (permutation) of mode light to be outputted from output port 2 as output modes.

In Table 1, with respect to refractive index changing means 8 (π phase shift region), "A" denotes refractive index changing means 8 arranged in another branched waveguide 61*b* of first Y-branch waveguide 61; "B" denotes refractive index changing means 8 arranged in waveguide 71*a* between first merge waveguide 71 and fourth Y-branch waveguide 64; "C" denotes refractive index changing means 8 arranged in waveguide 73*a* between third merge waveguide 73 and fourth merge waveguide 74; "D" denotes refractive index changing means 8 arranged in one branched waveguide 64*a* of fourth Y-branch waveguide 64; "E" denotes refractive index changing means 8 arranged in another branched waveguide 64*b* of fourth Y-branch waveguide 64; and "F" denotes refractive index changing means 8 arranged in another branched waveguide 63*b* of third Y-branch waveguide 63.

Further, in Table 1, the indication "●" in each column of refractive index changing means 8 (π phase shift region)

denotes a state in which refractive index changing means 8 is turned on (a voltage is applied to first electrode 4a and second electrode 4b). The indication "-" in each column of refractive index changing means 8 (π phase shift region) denotes a state in which refractive index changing means 8 is turned off.

TABLE 1

| Switching Pattern | Refractive Index Changing Means 8 (π Phase Shift Region) | | | | | | Input Mode | | | |
|---|---|---|---|---|---|---|---|---|---|---|
| | A | B | C | D | E | F | 0 | 1 | 2 | 3 |
| 1 | — | — | — | — | — | — | Output Mode 0 | 1 | 2 | 3 |
| 2 | — | — | — | — | ● | ● | 1 | 0 | 3 | 2 |
| 3 | — | — | — | ● | — | ● | 3 | 2 | 1 | 0 |
| 4 | — | — | — | ● | ● | — | 2 | 3 | 0 | 1 |
| 5 | — | — | ● | — | — | — | 0 | 1 | 3 | 2 |
| 6 | — | — | ● | — | ● | ● | 1 | 0 | 2 | 3 |
| 7 | — | — | ● | ● | — | ● | 2 | 3 | 1 | 0 |
| 8 | — | — | ● | ● | ● | — | 3 | 2 | 0 | 1 |
| 9 | — | ● | — | — | ● | — | 0 | 3 | 2 | 1 |
| 10 | — | ● | — | — | ● | ● | 1 | 2 | 3 | 0 |
| 11 | — | ● | — | ● | — | ● | 3 | 0 | 1 | 2 |
| 12 | — | ● | — | ● | ● | — | 2 | 1 | 0 | 3 |
| 13 | — | ● | ● | — | — | — | 0 | 2 | 3 | 1 |
| 14 | — | ● | ● | — | — | ● | 1 | 3 | 2 | 0 |
| 15 | — | ● | ● | ● | — | ● | 2 | 0 | 1 | 3 |
| 16 | — | ● | ● | ● | ● | — | 3 | 1 | 0 | 2 |
| 17 | ● | ● | — | — | — | — | 0 | 3 | 1 | 2 |
| 18 | ● | ● | — | — | ● | ● | 1 | 2 | 0 | 3 |
| 19 | ● | ● | — | ● | — | ● | 3 | 0 | 2 | 1 |
| 20 | ● | ● | — | ● | ● | — | 2 | 1 | 3 | 0 |
| 21 | ● | ● | ● | — | — | — | 0 | 2 | 1 | 3 |
| 22 | ● | ● | ● | — | ● | ● | 1 | 3 | 0 | 2 |
| 23 | ● | ● | ● | ● | — | ● | 2 | 0 | 3 | 1 |
| 24 | ● | ● | ● | ● | ● | — | 3 | 1 | 2 | 0 |

In addition, Table 1 shows one example of 24 output modes by selecting on/off of "A" to "F" of refractive index changing means 8 (π phase shift region) as appropriate. However, besides the on/off selection of "A" to "F" of refractive index changing means 8 (π phase shift region) shown in Table 1, additional on/off selection overlapping 24 patterns of output modes may be available. In particular, 64 (=2×2×23×2) switching patterns may be available for the arrangement of refractive index changing means 8 shown in FIG. 16(*a*).

Therefore, in the description of the operation of optical mode switch 100, the case where refractive index changing means 8 (π phase shift region) arranged in one branched waveguide 64a and another branched waveguide 64b of fourth Y-branch waveguide 64, and waveguide 73a between third merge waveguide 73 and fourth merge waveguide 74 is turned on (the eighth switching pattern shown in Table 1), as shown in FIG. 16(*b*), will be described as one example of the switching patterns. However, the same method of thinking holds for the operation of optical mode switch 100 by other switching patterns.

Zero-order mode light (by broken line in FIG. 16(*b*)), first-order mode light (by chain line in FIG. 16(*b*)), second-order mode light (by dotted line in FIG. 16(*b*)), and third-order mode light (by solid line in FIG. 16(*b*)) that are incident on input port 1 of optical mode switch 100 enter first Y-branch waveguide 61.

Then, mode light incident on first Y-branch waveguide 61 (zero-order mode light, first-order mode light, second-order mode light, and third-order mode light) is equally divided into two and branched. One mode light after equal division propagates through one waveguide 61a of first Y-branch waveguide 61 and enters second Y-branch waveguide 62. Another mode light after equal division propagates through another waveguide 61b (refractive index changing region 3 of refractive index changing means 8) of first Y-branch waveguide 61 and enters third Y-branch waveguide 63.

In this case, the zero-order mode light incident on first Y-branch waveguide 61 propagates through one waveguide 61a and another waveguide 61b of first Y-branch waveguide 61 as zero-order mode light, respectively.

Further, the first-order mode light incident on first Y-branch waveguide 61 propagates through one waveguide 61a of first Y-branch waveguide 61 as zero-order mode light, and propagates through another waveguide 61b of first Y-branch waveguide 61 as zero-order mode light (hereinafter referred to as "inverted zero-order mode light") that is out of phase by π ith the zero-order mode light propagating through one waveguide 61a of first Y-branch waveguide 61.

Further, the second-order mode light incident on first Y-branch waveguide 61 propagates through one waveguide 61a of first Y-branch waveguide 61 as first-order mode light, and propagates through another waveguide 61b of first Y-branch waveguide 61 as first-order mode light (hereinafter referred to as "inverted first-order mode light") that is out of phase by it with the first-order mode light propagating through one waveguide 61a of first Y-branch waveguide 61.

Further, the third-order mode light incident on first Y-branch waveguide 61 propagates through one waveguide 61a and another waveguide 61b of first Y-branch waveguide 61 as first-order mode light, respectively.

As seen above, mode light of first-order mode or less will propagate through one waveguide 61a and another waveguide 61b of first Y-branch waveguide 61.

Then, mode light incident on second Y-branch waveguide 62 (zero-order mode light, zero-order mode light, first-order mode light, and first-order mode light) is equally divided into two and branched. One mode light after equal division propagates through one waveguide 62a of second Y-branch waveguide 62 and enters first merge waveguide 71. Another mode light after equal division propagates through another waveguide 62b of second Y-branch waveguide 62 and enters second merge waveguide 72.

In this case, the zero-order mode light incident on second Y-branch waveguide 62 propagates through one waveguide 62a and another waveguide 62b of second Y-branch waveguide 62 as zero-order mode light, respectively. Further, the first-order mode light incident on second Y-branch waveguide 62 propagates through another waveguide 62b of second Y-branch waveguide 62 as zero-order mode light, and propagates through one waveguide 62a of second Y-branch waveguide 62 as zero-order mode light (inverted zero-order mode light) that is out of phase by $\pi$ with the zero-order mode light propagating through another waveguide 62b of second Y-branch waveguide 62. As seen above, zero-order mode light will propagate through one waveguide 62a and another waveguide 62b of second Y-branch waveguide 62.

Similarly, mode light incident on third Y-branch waveguide 63 (zero-order mode light, inverted zero-order mode light, inverted first-order mode light, and first-order mode light) is equally divided into two and branched. One mode light after equal division propagates through one waveguide 63a of third Y-branch waveguide 63 and enters first merge waveguide 71. Another mode light after equal division propagates through another waveguide 63b of third Y-branch waveguide 63 and enters third merge waveguide 73. In this case, the zero-order mode light incident on third Y-branch waveguide 63 propagates through one waveguide 63a and another waveguide 63b of third Y-branch waveguide 63 as zero-order mode light, respectively.

Further, the inverted zero-order mode light incident on third Y-branch waveguide 63 propagates through one waveguide 63a and another waveguide 63b of third Y-branch waveguide 63 as inverted zero-order mode light, respectively. Further, the inverted first-order mode light incident on third Y-branch waveguide 63 propagates through another waveguide 63b of third Y-branch waveguide 63 as zero-order mode light, and propagates through one waveguide 63a of third Y-branch waveguide 63 as zero-order mode light (inverted zero-order mode light) that is out of phase by $\pi$ with the zero-order mode light propagating through another waveguide 63b of third Y-branch waveguide 63. Further, the first-order mode light incident on third Y-branch waveguide 63 propagates through one waveguide 63a of third Y-branch waveguide 63 as zero-order mode light, and propagates through another waveguide 63b of third Y-branch waveguide 63 as zero-order mode light (inverted zero-order mode light) that is out of phase by $\pi$ with the zero-order mode light propagating through one waveguide 63a of third Y-branch waveguide 63. As seen above, zero-order mode light will propagate through one waveguide 63a and another waveguide 63b of third Y-branch waveguide 63.

Then, mode light (zero-order mode light, zero-order mode light, inverted zero-order mode light, and inverted zero-order mode light), incident on first merge waveguide 71 from one waveguide 62a of second Y-branch waveguide 62, and mode light (zero-order mode light, inverted zero-order mode light, inverted zero-order mode light, and zero-order mode light), incident on first merge waveguide 71 from one waveguide 63a of third Y-branch waveguide 63, are coupled by first merge waveguide 71, respectively, and then propagates through waveguide 71a (refractive index changing region 3 of refractive index changing means 8) between first merge waveguide 71 and fourth Y-branch waveguide 64 and enters fourth Y-branch waveguide 64. In this case, zero-order mode light incident on first merge waveguide 71 from one waveguide 62a of second Y-branch waveguide 62 and zero-order mode light incident on first merge waveguide 71 from one waveguide 63a of third Y-branch waveguide 63 are coupled by first merge waveguide 71 and enters fourth Y-branch waveguide 64 as zero-order mode light.

Further, zero-order mode light incident on first merge waveguide 71 from one waveguide 62a of second Y-branch waveguide 62 and inverted zero-order mode light incident on first merge waveguide 71 from one waveguide 63a of third Y-branch waveguide 63 are coupled by first merge waveguide 71 and enters fourth Y-branch waveguide 64 as first-order mode light. Further, inverted zero-order mode light incident on first merge waveguide 71 from one waveguide 62a of second Y-branch waveguide 62 and inverted zero-order mode light incident on first merge waveguide 71 from one waveguide 63a of third Y-branch waveguide 63 are coupled by first merge waveguide 71 and enters fourth Y-branch waveguide 64 as inverted zero-order mode light. Further, inverted zero-order mode light incident on first merge waveguide 71 from one waveguide 62a of second Y-branch waveguide 62 and zero-order mode light incident on first merge waveguide 71 from one waveguide 63a of third Y-branch waveguide 63 are coupled by first merge waveguide 71 and enters fourth Y-branch waveguide 64 as inverted first-order mode light. As seen above, mode light of first-order mode or less will propagate through waveguide 71a between first merge waveguide 71 and fourth Y-branch waveguide 64.

Then, mode light incident on fourth Y-branch waveguide 64 (zero-order mode light, first-order mode light, inverted zero-order mode light, and inverted first-order mode light) is equally divided into two and branched. One mode light after equal division propagates through one waveguide 64a (refractive index changing region 3 of refractive index changing means 8) of fourth Y-branch waveguide 64 and enters second merge waveguide 72. Another mode light after equal division propagates through another waveguide 64b (refractive index changing region 3 of refractive index changing means 8) of fourth Y-branch waveguide 64 and enters third merge waveguide 73. In this case, the zero-order mode light incident on fourth Y-branch waveguide 64 propagates through one waveguide 64a and another waveguide 64b of fourth Y-branch waveguide 64 as zero-order mode light, respectively.

Further, the first-order mode light incident on fourth Y-branch waveguide 64 propagates through one waveguide 64a of fourth Y-branch waveguide 64 as zero-order mode light, and propagates through another waveguide 64b of fourth Y-branch waveguide 64 as zero-order mode light (inverted zero-order mode light) that is out of phase by $\pi$ with the zero-order mode light propagating through one waveguide 64a of fourth Y-branch waveguide 64. Further, the inverted zero-order mode light incident on fourth Y-branch waveguide 64 propagates through one waveguide 64a and another waveguide 64b of fourth Y-branch waveguide 64 as inverted zero-order mode light, respectively. Further, the inverted first-order mode light incident on fourth Y-branch waveguide 64 propagates through another waveguide 64b of fourth Y-branch waveguide 64 as zero-order mode light, and propagates through one waveguide 64a of fourth Y-branch waveguide 64 as zero-order mode light (inverted zero-order mode light) that is out of phase by $\pi$ with the zero-order mode light propagating through another waveguide 64b of fourth Y-branch waveguide 64. As seen above, zero-order mode light will propagate through one waveguide 64a and another waveguide 64b of fourth Y-branch waveguide 64.

In this state, when a voltage is applied to first electrode 4a and second electrode 4b in refractive index changing means 8 ($\pi$ phase shift region D) arranged in one waveguide 64a of fourth Y-branch waveguide 64 and refractive index changing means 8 (π phase shift region E) arranged in another waveguide 64b of fourth Y-branch waveguide 64, forward bias is applied to the pin junction composed of p-type semiconductor region 132, intrinsic semiconductor region 131, and n-type semiconductor region 133. This will cause carriers to be supplied from p-type semiconductor region 132 and n-type semiconductor region 133 to rib portion 131a of intrinsic semiconductor region 131. The supplied carries accumulate in rib portion 131a. By the plasma effect of the carriers, it is possible to change the phase of the mode light propagating through one waveguide 64a and another waveguide 64b of fourth Y-branch waveguide 64 by π [rad]. That is, the mode light propagating through one waveguide 64a of fourth Y-branch waveguide 64 (zero-order mode light, zero-order mode light, inverted zero-order mode light, and inverted zero-order mode light) will enter third merge waveguide 73 as mode light (inverted zero-order mode light, inverted zero-order mode light, zero-order mode light, and zero-order mode light) after zero-order mode light is switched to inverted zero-order mode light and inverted zero-order mode light is switched to zero-order mode light.

Further, the mode light propagating through another waveguide 64b of fourth Y-branch waveguide 64 (zero-order mode light, inverted zero-order mode light, inverted zero-order mode light, and zero-order mode light) will enter third merge waveguide 73 as mode light (inverted zero-order mode light, zero-order mode light, zero-order mode light, and inverted zero-order mode light) after zero-order mode light is switched to inverted zero-order mode light and inverted zero-order mode light is switched to zero-order mode light.

Then, mode light (zero-order mode light, zero-order mode light, zero-order mode light, and zero-order mode light), incident on second merge waveguide 72 from another waveguide 62b of second Y-branch waveguide 62, and mode light (inverted zero-order mode light, inverted zero-order mode light, zero-order mode light, and zero-order mode light), incident on second merge waveguide 72 from one waveguide 64a of fourth Y-branch waveguide 64 via refractive index changing means 8 (π phase shift region D), are coupled by second merge waveguide 72, respectively, and then enter fourth merge waveguide 74. In this case, zero-order mode light, incident on second merge waveguide 72 from another waveguide 62b of second Y-branch waveguide 62, and inverted zero-order mode light, incident on second merge waveguide 72 from one waveguide 64a of fourth Y-branch waveguide 64 via refractive index changing means 8 (π phase shift region D), are coupled by second merge waveguide 72 and enter fourth merge waveguide 74 as first-order mode light.

Further, zero-order mode light, incident on second merge waveguide 72 from another waveguide 62b of second Y-branch waveguide 62, and inverted zero-order mode light, incident on second merge waveguide 72 from one waveguide 64a of fourth Y-branch waveguide 64 via refractive index changing means 8 (π phase shift region D), are coupled by second merge waveguide 72 and enter fourth merge waveguide 74 as first-order mode light. Further, zero-order mode light, incident on second merge waveguide 72 from another waveguide 62b of second Y-branch waveguide 62, and zero-order mode light, incident on second merge waveguide 72 from one waveguide 64a of fourth Y-branch waveguide 64 via refractive index changing means 8 (π phase shift region D), are coupled by second merge waveguide 72 and enter fourth merge waveguide 74 as zero-order mode light. Further, zero-order mode light, incident on second merge waveguide 72 from another waveguide 62b of second Y-branch waveguide 62, and zero-order mode light, incident on second merge waveguide 72 from one waveguide 64a of fourth Y-branch waveguide 64 via refractive index changing means 8 (π phase shift region D), are coupled by second merge waveguide 72 and enter fourth merge waveguide 74 as zero-order mode light. As seen above, mode light of first-order mode or less will propagate through waveguide 72a between second merge waveguide 72 and fourth merge waveguide 74.

Similarly, mode light (zero-order mode light, inverted zero-order mode light, zero-order mode light, and inverted zero-order mode light), incident on third merge waveguide 73 from another waveguide 63b (refractive index changing region 3 of refractive index changing means 8) of third Y-branch waveguide 63, and mode light (inverted zero-order mode light, zero-order mode light, zero-order mode light, and inverted zero-order mode light), incident on third merge waveguide 73 from another waveguide 64b of fourth Y-branch waveguide 64 via refractive index changing means 8 (π phase shift region E), are coupled by third merge waveguide 73, respectively, and then enter fourth merge waveguide 74. In this case, zero-order mode light, incident on third merge waveguide 73 from another waveguide 63b of third Y-branch waveguide 63, and inverted zero-order mode light, incident on third merge waveguide 73 from another waveguide 64b of fourth Y-branch waveguide 64 via refractive index changing means 8 (π phase shift region E), are coupled by third merge waveguide 73 to be inverted first-order mode light.

Further, inverted zero-order mode light, incident on third merge waveguide 73 from another waveguide 63b of third Y-branch waveguide 63, and zero-order mode light, incident on third merge waveguide 73 from another waveguide 64b of fourth Y-branch waveguide 64 via refractive index changing means 8 (π phase shift region E), are coupled by third merge waveguide 73 to be first-order mode light. Further, zero-order mode light, incident on third merge waveguide 73 from another waveguide 63b of third Y-branch waveguide 63, and zero-order mode light, incident on third merge waveguide 73 from another waveguide 64b of fourth Y-branch waveguide 64 via refractive index changing means 8 (π phase shift region E), are coupled by third merge waveguide 73 to be zero-order mode light. Further, inverted zero-order mode light, incident on third merge waveguide 73 from another waveguide 63b of third Y-branch waveguide 63, and inverted zero-order mode light, incident on third merge waveguide 73 from another waveguide 64b of fourth Y-branch waveguide 64 via refractive index changing means 8 (π phase shift region E), are coupled by third merge waveguide 73 to be inverted zero-order mode light. As seen above, mode light of first-order mode or less will propagate through waveguide 73a between third merge waveguide 73 and fourth merge waveguide 74.

In this state, when a voltage is applied to first electrode 4a and second electrode 4b in refractive index changing means 8 (π phase shift region C) arranged in waveguide 73a between third merge waveguide 73 and fourth merge waveguide 74, forward bias is applied to the pin junction composed of p-type semiconductor region 132, intrinsic semiconductor region 131, and n-type semiconductor region 133. This will cause carriers to be supplied from p-type semiconductor region 132 and n-type semiconductor region 133 to rib portion 131a of intrinsic semiconductor region 131. The supplied carries accumulate in rib portion 131a. By the plasma effect of the carriers, it is possible to change the phase of the first-order mode light, of the mode light propagating through waveguide 73a between third merge waveguide 73 and fourth merge waveguide 74, by π [rad], while the phase of zero-order mode light remains unchanged without inversion.

That is, the mode light propagating through waveguide 73a between third merge waveguide 73 and fourth merge waveguide 74 (inverted first-order mode light, first-order mode light, zero-order mode light, and inverted zero-order mode light) will enter third merge waveguide 73 as mode light (first-order mode light, inverted first-order mode light, zero-order mode light, and inverted zero-order mode light) after zero-order mode light becomes zero-order mode light as it is, inverted zero-order mode light becomes inverted zero-order mode light as it is, first-order mode light is switched to inverted first-order mode light, and inverted first-order mode light is switched to first-order mode light.

Then, mode light (first-order mode light, first-order mode light, zero-order mode light, and zero-order mode light), incident on fourth merge waveguide 74 from second merge waveguide 72, and mode light (first-order mode light, inverted first-order mode light, zero-order mode light, and inverted zero-order mode light), incident on fourth merge waveguide 74 from third merge waveguide 73 via refractive index changing means 8 (π phase shift region C), are coupled by fourth merge waveguide 74, respectively, and then emitted from output port 2. In this case, first-order mode light incident on fourth merge waveguide 74 from second merge waveguide 72 and first-order mode light incident on fourth merge waveguide 74 from third merge waveguide 73 via refractive index changing means 8 (π phase shift region D) are coupled by fourth merge waveguide 74 to be emitted from output port 2 as third-order mode light.

Further, first-order mode light incident on fourth merge waveguide 74 from second merge waveguide 72 and inverted first-order mode light incident on fourth merge waveguide 74 from third merge waveguide 73 via refractive index changing means 8 (π phase shift region D) are coupled by fourth merge waveguide 74 to be emitted from output port 2 as second-order mode light. Further, zero-order mode light incident on fourth merge waveguide 74 from second merge waveguide 72 and zero-order mode light incident on fourth merge waveguide 74 from third merge waveguide 73 via refractive index changing means 8 (π phase shift region D) are coupled by fourth merge waveguide 74 to be emitted from output port 2 as zero-order mode light. Further, first-order mode light incident on fourth merge waveguide 74 from second merge waveguide 72 and inverted zero-order mode light incident on fourth merge waveguide 74 from third merge waveguide 73 via refractive index changing means 8 (π phase shift region D) are coupled by fourth merge waveguide 74 to be emitted from output port 2 as first-order mode light.

As seen above, optical mode switch 100 can switch zero-order mode light incident on input port 1 to third-order mode light and output the resultant mode light from output port 2, switch first-order mode light incident on input port 1 to second-order mode light and output the resultant mode light from output port 2, switch second-order mode light incident on input port 1 to zero-order mode light and output the resultant mode light from output port 2, and switch third-order mode light incident on input port 1 to first-order mode light and output the resultant mode light from output port 2, in accordance with the eighth switching pattern shown in Table 1.

Furthermore, it could be confirmed, by beam propagation method (BPM) simulation, that optical mode switch 100 according to the present embodiment, when inputting zero-order mode light from input port 1, outputs zero-order mode light from output port 2 as shown in FIG. 17(a), outputs first-order mode light from output port 2 as shown in FIG. 17(b), outputs second-order mode light from output port 2 as shown in FIG. 17(c), and outputs third-order mode light from output port 2 as shown in FIG. 17(d), by selecting six refractive index changing means 8 (it phase shift region A, π phase shift region B, π phase shift region C, π phase shift region D, π phase shift region E, and π phase shift region F) as appropriate.

In the optical mode switch, since mode information is used instead of port information that is used in the conventional spatial optical switch, it is necessary to discuss crosstalk between modes instead of crosstalk between ports.

Table 2 shows the results of the most suitable refractive index change in refractive index changing means 8 for switching each input mode (zero-order mode light, first-order mode light, second-order mode light, and third-order mode light) to each output mode (zero-order mode light, first-order mode light, second-order mode light, and third-order mode light) and the lowest inter-mode crosstalk at that time.

TABLE 2

| Input Mode | Output Mode | Refractive Index Variation | Crosstalk [dB] |
| --- | --- | --- | --- |
| 0 | 0 | 0 | −31.8 |
|   | 1 | −0.0054 | −29.7 |
|   | 2 | −0.0054 | −24.2 |
|   | 3 | −0.0054 | −32.2 |
| 1 | 0 | 0 | −26.0 |
|   | 1 | −0.0054 | −21.1 |
|   | 2 | −0.0054 | −27.5 |
|   | 3 | −0.0054 | −19.1 |
| 2 | 0 | 0 | −24.0 |
|   | 1 | −0.0054 | −31.7 |
|   | 2 | −0.0054 | −32.0 |
|   | 3 | −0.0054 | −29.1 |
| 3 | 0 | 0 | −27.2 |
|   | 1 | −0.0054 | −19.0 |
|   | 2 | −0.0054 | −26.2 |
|   | 3 | −0.0054 | −21.1 |

As shown in Table 2, the worst inter-mode crosstalk was estimated to be less than −19.0 dB when the third-order mode light, which was the input mode, was switched into the first-order mode light, which was the output mode.

As described above, optical mode switch 100 according to the present embodiment achieves the action/effect that it can correspond to light having four modes (zero-order mode, first-order mode, second-order mode, and third-order mode) and switch zero-order mode light, first-order mode light, second-order mode light, or three-order mode light to zero-order mode light, first-order mode light, second-order mode light, or third-order mode light.

In addition, optical mode switch 100 according to the present embodiment has the configuration that can create 24 output modes and minimize the number of refractive index changing means 8. However, refractive index changing means 8 may be arranged in other than another branched waveguide 61b of first Y-branch waveguide 61; waveguide 71a between first merge waveguide 71 and fourth Y-branch waveguide 64; one branched waveguide 64a and another branched waveguide 64b of fourth Y-branch waveguide 64; another branched waveguide 63b of third Y-branch waveguide 63; and waveguide 73a between third merge waveguide 73 and fourth merge waveguide 74.

For example, it may be considered that optical mode switch 100 has the configuration in which refractive index changing means 8 is further arranged in one branched waveguide 61a of first Y-branch waveguide 61; another branched waveguide 62b of second Y-branch waveguide 62; another branched waveguide 63b of third Y-branch waveguide 63; and waveguide 72a between second merge waveguide 72 and fourth merge waveguide 74, as shown in FIG. 16(c). By this configuration, optical mode switch 100 can create desired 24 output modes by making refractive index changing means 8 having caused no malfunction function, when a malfunction was caused in any refractive index changing means 8 of a plurality of refractive index changing means 8. In addition, optical mode switch 100 shown in FIG. 16(c) has refractive index changing means 8 arranged in linear waveguides. However, refractive index changing means 8 may be arranged in curved waveguides.

Sixth Embodiment of the Present Invention

Figure 18A:
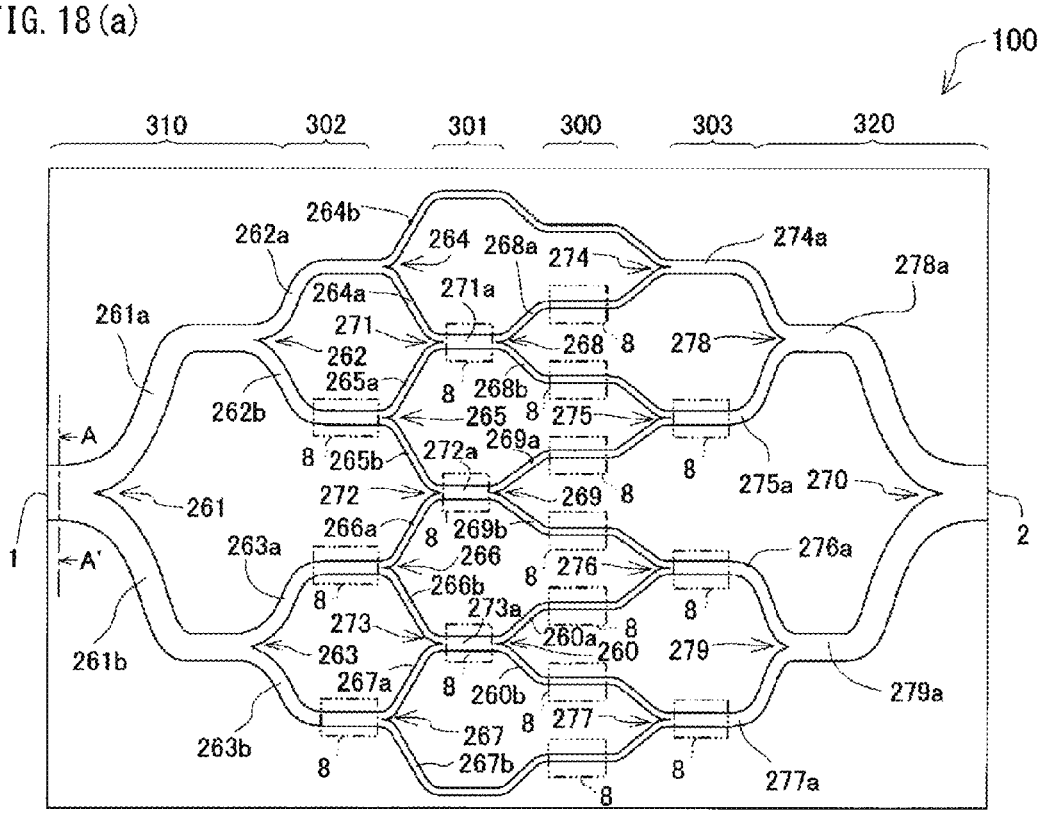
FIG. 18(a) is a plan view showing an example of a schematic configuration of an optical mode switch according to the sixth embodiment.
Figure 18B:
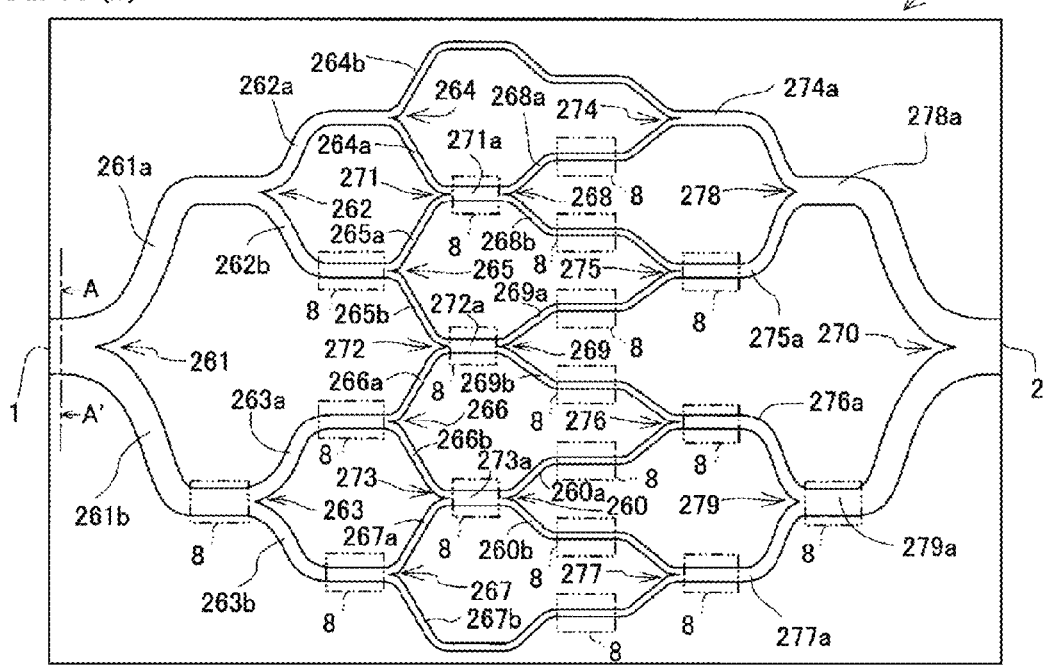
FIG. 18(b) is a plan view showing another example of a schematic configuration of an optical mode switch according to the sixth embodiment.

FIG. 18(a) is a plan view showing an example of a schematic configuration of an optical mode switch according to the sixth embodiment, and FIG. 18(b) is a plan view showing another example of a schematic configuration of an optical mode switch according to the sixth embodiment. In FIG. 18(a) and FIG. 18(b), the same reference numerals as in FIG. 1(a) to FIG. 17(d) show the same or corresponding parts, and description thereof will be omitted.

In the above-mentioned fifth embodiment, it has described optical mode switch 100 that corresponds to light having four modes (zero-order mode, first-order mode, second-order mode, and third-order mode) and switches zero-order mode light to third-order mode light into zero-order mode light to third-order mode light. In contrast, the present embodiment will further extend the function of optical mode switch 100, and describe optical mode switch 100 that corresponds to light having eight modes (zero-order mode, first-order mode, second-order mode, fourth-order mode, fifth-order mode, sixth-order mode, and seventh-order mode) and switches zero-order mode light to seventh-order mode light, to zero-order mode light to seventh-order mode light.

Mode switch means according to the present embodiment includes, as shown in FIG. 18(a): a Y-branch waveguide (hereinafter referred to as "first Y-branch waveguide 261") that divides mode light incident from input port 1 into two; a Y-branch waveguide (hereinafter referred to as "second Y-branch waveguide 262") that divides mode light propagating through one branched waveguide 261a of first Y-branch waveguide 261 into two; a Y-branch waveguide (hereinafter referred to as "third Y-branch waveguide 263") that divides mode light propagating through another branched waveguide 261b of first Y-branch waveguide 261 into two; a Y-branch waveguide (hereinafter referred to as "fourth Y-branch waveguide 264") that divides mode light propagating through one branched waveguide 262a of second Y-branch waveguide 262 into two; a Y-branch waveguide (hereinafter referred to as "fifth Y-branch waveguide 265") that divides mode light propagating through another branched waveguide 262b of second Y-branch waveguide 262 into two; a Y-branch waveguide (hereinafter referred to as "sixth Y-branch waveguide 266") that divides mode light propagating through one branched waveguide 263a of third Y-branch waveguide 263 into two; a Y-branch waveguide (hereinafter referred to as "seventh Y-branch waveguide 267") that divides mode light propagating through another branched waveguide 263b of third Y-branch waveguide 263 into two; a Y-branch waveguide (hereinafter referred to as "eighth Y-branch waveguide 268") that divides mode light incident from first merge waveguide 271, which will be described below, into two; a Y-branch waveguide (hereinafter referred to as "ninth Y-branch waveguide 269") that divides mode light incident from second merge waveguide 272, which will be described below, into two; and a Y-branch waveguide (hereinafter referred to as "tenth Y-branch waveguide 260") that divides mode light incident from third merge waveguide 273, which will be described below, into two.

Further, mode switch means according to the present embodiment includes: a merge waveguide (hereinafter referred to as "first merge waveguide 271") that couples mode light propagating through one branched waveguide 264a of fourth Y-branch waveguide 264 and mode light propagating through one branched waveguide 265a of fifth Y-branch waveguide 265; a merge waveguide (hereinafter referred to as "second merge waveguide 272") that couples mode light propagating through another branched waveguide 265b of fifth Y-branch waveguide 265 and mode light propagating through one branched waveguide 266a of sixth Y-branch waveguide 266; a merge waveguide (hereinafter referred to as "third merge waveguide 273") that couples mode light propagating through another branched waveguide 266b of sixth Y-branch waveguide 266 and mode light propagating through one branched waveguide 267a of seventh Y-branch waveguide 267; a merge waveguide (hereinafter referred to as "fourth merge waveguide 274") that couples mode light propagating through another branched waveguide 264b of fourth Y-branch waveguide 264 and mode light propagating through one branched waveguide 268a of eighth Y-branch waveguide 268; a merge waveguide (hereinafter referred to as "fifth merge waveguide 275") that couples mode light propagating through another branched waveguide 268b of eighth Y-branch waveguide 268 and mode light propagating through one branched waveguide 269a of ninth Y-branch waveguide 269; a merge waveguide (hereinafter referred to as "sixth merge waveguide 276") that couples mode light propagating through another branched waveguide 269b of ninth Y-branch waveguide 269 and mode light propagating through one branched waveguide 260a of tenth Y-branch waveguide 260; a merge waveguide (hereinafter referred to as "seventh merge waveguide 277") that couples mode light propagating through another branched waveguide 267b of seventh Y-branch waveguide 267 and mode light propagating through another branched waveguide 260b of tenth Y-branch waveguide 260; a merge waveguide (hereinafter referred to as "eighth merge waveguide 278") that couples mode light incident from fourth merge waveguide 274 and mode light incident from fifth merge waveguide 275; a merge waveguide (hereinafter referred to as "ninth merge waveguide 279") that couples mode light incident from sixth merge waveguide 276 and mode light incident from seventh merge waveguide 277; a merge waveguide (hereinafter referred to as "tenth merge waveguide 270") that couples mode light incident from eighth merge waveguide 278 and mode light incident from ninth merge waveguide 279 to output the coupled mode light from output port 2.

Refractive index changing means 8 according to the present embodiment is arranged in: another branched waveguide 262b of second Y-branch waveguide 262; one branched waveguide 263a and another branched waveguide 263b of third Y-branch waveguide 263; waveguide 271a between first merge waveguide 271 and eighth Y-branch waveguide 268; waveguide 272a between second merge waveguide 272 and ninth Y-branch waveguide 269; waveguide 273a between third merge waveguide 273 and tenth Y-branch waveguide 260; one branched waveguide 268a and another branched waveguide 268b of eighth Y-branch waveguide 268; one branched waveguide 269a and another branched waveguide 269b of ninth Y-branch waveguide 269; one branched waveguide 260a and another branched waveguide 260b of tenth Y-branch waveguide 260; another branched waveguide 267b of seventh Y-branch waveguide 267; waveguide 275a between fifth merge waveguide 275 and eighth merge waveguide 278; waveguide 276a between sixth merge waveguide 276 and ninth merge waveguide 279; and waveguide 277a between seventh merge waveguide 277 and ninth merge waveguide 279, as shown in FIG. 18(a).

In particular, in optical mode switch 100 according to the present embodiment, since four kinds of mode light, zero-order mode light to seventh-order mode light, enter input port 1 as input modes, 40320 patterns, which is the factorial of eight (8!), can be considered as the order (permutation) of mode light to be outputted from output port 2 as output modes. In addition, 65536 ($=2^3 \times 2^3 \times 2^7 \times 2^3$) switching patterns may be available for the arrangement of refractive index changing means 8 shown in FIG. 18(a).

Incidentally, this sixth embodiment differs from the fifth embodiment only in that it corresponds to eight kinds of mode light of zero-order mode light to seventh-order mode light. The operation of optical mode switch 100 according to the present embodiment can be easily inferred from the operation of optical mode switch 100 according to the fifth embodiment and, therefore, the explanation thereof will be omitted.

As described above, optical mode switch 100 according to the present embodiment achieves the action/effect that it can correspond to light having eight modes (zero-order mode, first-order mode, second-order mode, third-order mode, fourth-order mode, fifth-order mode, sixth-order mode, and seventh-order mode) and switch zero-order mode light to seventh-order mode light, to zero-order mode light to seventh-order mode light.

In addition, optical mode switch 100 according to the present embodiment has the configuration that can create desired 40320 output modes and minimize the number of refractive index changing means 8. However, refractive index changing means 8 may be arranged in other than: another branched waveguide 262b of second Y-branch waveguide 262; one branched waveguide 263a and another branched waveguide 263b of third Y-branch waveguide 263; waveguide 271a between first merge waveguide 271 and eighth Y-branch waveguide 268; waveguide 272a between second merge waveguide 272 and ninth Y-branch waveguide 269; waveguide 273a between third merge waveguide 273 and tenth Y-branch waveguide 260; one branched waveguide 268a and another branched waveguide 268b of eighth Y-branch waveguide 268; one branched waveguide 269a and another branched waveguide 269b of ninth Y-branch waveguide 269; one branched waveguide 260a and another branched waveguide 260b of tenth Y-branch waveguide 260; another branched waveguide 267b of seventh Y-branch waveguide 267; waveguide 275a between fifth merge waveguide 275 and eighth merge waveguide 278; waveguide 276a between sixth merge waveguide 276 and ninth merge waveguide 279; and waveguide 277a between seventh merge waveguide 277 and ninth merge waveguide 279.

For example, it may be considered that optical mode switch 100 has the configuration in which refractive index changing means 8 is further arranged in: another branched waveguide 261b of first Y-branch waveguide 261; and waveguide 279a between ninth merge waveguide 279 and tenth merge waveguide 270, as shown in FIG. 18(b).

Further, it may be considered that optical mode switch 100 has the configuration in which refractive index changing means 8 is further arranged in: one branched waveguide 261a and another branched waveguide 261b of first Y-branch waveguide 261; one branched waveguide 262a of second Y-branch waveguide 262; another branched waveguide 264b of fourth Y-branch waveguide 264; waveguide 274a between fourth merge waveguide 274 and eighth merge waveguide 278; waveguide 278a between eighth merge waveguide 278 and tenth merge waveguide 270; waveguide 279a between ninth merge waveguide 279 and tenth merge waveguide 270. By this configuration, optical mode switch 100 can create desired 40320 output modes by making refractive index changing means 8 having caused no malfunction function, when a malfunction was caused in any refractive index changing means 8 of a plurality of refractive index changing means 8.

Other Embodiment of the Present Invention

In the above-mentioned fifth embodiment, it has described optical mode switch 100 that corresponds to light having four modes (zero-order mode, first-order mode, second-order mode, and third-order mode) and switches zero-order mode light to third-order mode light into zero-order mode light to third-order mode light. Also, in the above-mentioned sixth embodiment, it has described optical mode switch 100 that corresponds to light having eight modes (zero-order mode, first-order mode, second-order mode, third-order mode, fourth-order mode, fifth-order mode, sixth-order mode, and seventh-order mode) and switches zero-order mode light to seventh-order mode light into zero-order mode light to seventh-order mode light. In contrast, the present embodiment will generalize the arrangement of waveguides (Y-branch waveguide and merge waveguide) of optical mode switch 100, and describe optical mode switch 100 that corresponds to light having $2^n$ modes, zero-order mode light to $2^{n-1}$-order mode light (n is an integer of 2 or more).

In the following description, explanation will be made by reference to the plan view (FIG. 18(a)) showing the schematic configuration of optical mode switch 100 according to the sixth embodiment, but it is not limited to this optical mode switch 100.

Mode switch means includes input stage region 310 that is connected to input port 1 and in which one or more Y-branch waveguides (first Y-branch waveguide 261, second Y-branch waveguide 262, and third Y-branch waveguide 263) for dividing mode light into two are arranged.

Further, the mode switch means includes output stage region 320 that is connected to output port 2 and in which one or more merge waveguides (tenth merge waveguide 270, eighth merge waveguide 278, and ninth merge waveguide 279) for coupling two mode light are arranged.

Further, the mode switch means includes reference region 300 that is arranged between input stage region 310 and output stage region 320 and in which $2^n$ (eight) waveguides for propagating zero-order mode light (another branched waveguide 264b of fourth Y-branch waveguide 264; one branched waveguide 268a and another branched waveguide 268b of eighth Y-branch waveguide 268; one branched waveguide 269a and another branched waveguide 269b of ninth Y-branch waveguide 269; one branched waveguide 260a and another branched waveguide 260b of tenth Y-branch waveguide 260; and another branched waveguide 267b of seventh Y-branch waveguide 267) are juxtaposed.

Furthermore, the mode switch means includes former stage region 301 that is arranged in a former stage of reference region 300 and in which two waveguides (another branched waveguide 264b of fourth Y-branch waveguide 264 and another branched waveguide 267b of seventh Y-branch waveguide 267), connected to two outermost waveguides in reference region 300 respectively, and $2^{n-1}-1$ (three) waveguides (waveguide 271a between first merge waveguide 271 and eighth Y-branch waveguide 268; waveguide 272a between second merge waveguide 272 and ninth Y-branch waveguide 269; and waveguide 273a between three merge waveguide 273 and tenth Y-branch waveguide 260), connected to $2^{n-1}-1$ Y-branch waveguides (eighth Y-branch waveguide 268; ninth Y-branch waveguide 269; and tenth Y-branch waveguide 260) that each divides into two adjacent waveguides except for the two outermost waveguides in reference region 300, are juxtaposed.

Furthermore, the mode switch means includes second former stage region 302 that is arranged in a former stage of former stage region 301 and in which $2^n-1$ (four) waveguides (one branched waveguide 262a and another branched waveguide 262b of second Y-branch waveguide 262; and one branched waveguide 263a and another branched waveguide 263b of third Y-branch waveguide 263) are juxtaposed, via $2^{n-1}-1$ (three) merge waveguides (first merge waveguide 271; second merge waveguides 272; and third merge waveguide 273) to be coupled with $2^{n-1}-1$ waveguides in former stage region 301, and $2^{111}$ (four) Y-branch waveguides (fourth Y-branch waveguide 264; fifth Y-branch waveguides 265; sixth Y-branch waveguide 266; and seventh Y-branch waveguide 267) that divide into $2^n$ (eight) adjacent waveguides among $2^{n-1}$ (six) waveguides (one branched waveguide 264a of fourth Y-branch waveguide 264; one branched waveguide 265a and another branched waveguide 265b of fifth Y-branch waveguide 265; one branched waveguide 266a and another branched waveguide 266b of sixth Y-branch waveguide 266; one branched waveguide 267a of seventh Y-branch waveguide 267) before coupling of the $2^{n-1}-1$ (three) merge waveguides and two waveguides (another branched waveguide 264b of fourth Y-branch waveguide 264; and another branched waveguide 267b of seventh Y-branch waveguide 267) to be connected to two outermost waveguides in former stage region 301 respectively.

Further, the mode switch means includes latter stage region 303 that is arranged in a latter stage of reference region 300 and in which $2^{n-1}$ (four) waveguides (waveguide 274a between fourth merge waveguide 274 and eighth merge waveguide 278; waveguide 275a between fifth merge waveguide 275 and eighth merge waveguide 278; waveguide 276a between sixth merge waveguide 276 and ninth merge waveguide 279; and waveguide 277a between seventh merge waveguide 277 and ninth merge waveguide 279) to be connected to $2^{n-1}$ (four) merge waveguides (fourth merge waveguide 274; fifth merge waveguide 275; sixth merge waveguide 276; and seventh merge waveguide 277) that couple two adjacent waveguides in reference region 300, are juxtaposed.

Refractive index changing means 8 according to the present embodiment is arranged in: $2^n-1$ (seven) waveguides (one branched waveguide 268a and another branched waveguide 268b of eighth Y-branch waveguide 268; one branched waveguide 269a and another branched waveguide 269b of ninth Y-branch waveguide 269; one branched waveguide 260a and another branched waveguide 260b of tenth Y-branch waveguide 260; and another branched waveguide 267b of seventh Y-branch waveguide 267) except for one outermost waveguide in reference region 300 (another branched waveguide 264b of fourth Y-branch waveguide 264); $2^{n-1}-1$ (three) waveguides (waveguide 271a between first merge waveguide 271 and eighth Y-branch waveguide 268; waveguide 272a between second merge waveguide 272 and ninth Y-branch waveguide 269; and waveguide 273a between three merge waveguide 273 and tenth Y-branch waveguide 260) except for two outermost waveguides in former stage region 301 (another branched waveguide 264b of fourth Y-branch waveguide 264; and another branched waveguide 267b of seventh Y-branch waveguide 267); $2^{n-1}-1$ (three) waveguides (another branched waveguide 262b of second Y-branch waveguide 262; and one branched waveguide 263a and another branched waveguide 263b of third Y-branch waveguide 263) except for one outermost waveguide in second former stage region 302 (one branched waveguide 262a of second Y-branch waveguide 262), which does not make one outermost waveguide excluded in reference region 300 (another branched waveguide 264b of fourth Y-branch waveguide 264) a route; $2^{n-1}-1$ (three) waveguides (waveguide 275a between fifth merge waveguide 275 and eighth merge waveguide 278; waveguide 276a between sixth merge waveguide 276 and ninth merge waveguide 279; and waveguide 277a between seventh merge waveguide 277 and ninth merge waveguide 279) except for one outermost waveguide in latter stage region 303 (waveguide 274a between fourth merge waveguide 274 and eighth merge waveguide 278), which does not make one outermost waveguide excluded in reference region 300 (another branched waveguide 264b of fourth Y-branch waveguide 264) a route.

In particular, in optical mode switch 100 according to the present embodiment, since $2^n$ kinds of mode light, zero-order mode light to $2^n-1$-order mode light, enter input port 1 as input modes, $2^n!$ patterns, which is the factorial of $2^n$, can be considered as the order (permutation) of mode light to be outputted from output port 2 as output modes.

Incidentally, this embodiment differs from the fifth embodiment and the sixth embodiment only in that it generalized the arrangement of waveguides (Y-branch waveguide and merge waveguide) of optical mode switch 100. The operation of optical mode switch 100 according to the present embodiment can be easily inferred from the operation of optical mode switch 100 according to the fifth embodiment and, therefore, the explanation thereof will be omitted.

In addition, optical mode switch 100 according to the present embodiment has the configuration that can create desired $2^n!$ (the factorial of $2^n$) output modes and minimize the number of refractive index changing means 8. However, refractive index changing means 8 may be arranged in other waveguides.

For example, by arranging refractive index changing means 8 in all linear waveguides, optical mode switch 100 can create desired 2n! (the factorial of 2n) output modes by making refractive index changing means 8 having caused no malfunction function, when a malfunction was caused in any refractive index changing means 8 of a plurality of refractive index changing means 8.

REFERENCE SIGNS LIST

1 Input port
2 Output port

3 Refractive index changing region
3a Trench
4a First electrode
4b Second electrode
5 Contact hole
5a First connection
5b Second connection
6 Input waveguide
7 Output waveguide
8 Refractive index changing means
10 Waveguide
11 First linear waveguide
12 Second linear waveguide
13 Third linear waveguide
14 Curved waveguide
20 Y-branch waveguide
21 First branched waveguide
22 Second branched waveguide
23 Pre-branching waveguide
30 Merge Waveguide
31 First merging waveguide
32 Second merging waveguide
33 Post-merging waveguide
40 1×2 type MMI waveguide
50 2×1 type MMI waveguide
61 First Y-branch waveguide
61a One waveguide
61b Another waveguide
62 Second Y-branch waveguide
62a One waveguide
62b Another waveguide
63 Third Y-branch waveguide
63a One waveguide
63b Another waveguide
64 Fourth Y-branch waveguide
64a One waveguide
64b Another waveguide
71 First merge waveguide
71a Waveguide
72 Second merge waveguide
72a Waveguide
73 Third merge waveguide
73a Waveguide
74 Fourth merge waveguide
100 Optical mode switch
110 Substrate
120 First clad layer
130 Semiconductor layer
131 Intrinsic semiconductor region
131a Rib portion
131b Slab portion
132 P-type semiconductor region
133 N-type semiconductor region
140 Second clad layer
151 First metal layer
152 Second metal layer
161, 162, 163, 164, 165, 166 Mask
260 Tenth Y-branch waveguide
260a One waveguide
260b Another waveguide
261 First Y-branch waveguide
261a One waveguide
261b Another waveguide
262 Second Y-branch waveguide
262a One waveguide
262b Another waveguide
263 Third Y-branch waveguide
263a One waveguide
263b Another waveguide
264 Fourth Y-branch waveguide
264a One waveguide
264b Another waveguide
265 Fifth Y-branch waveguide
265a One waveguide
265b Another waveguide
266 Sixth Y-branch waveguide
266a One waveguide
266b Another waveguide
267 Seventh Y-branch waveguide
267a One waveguide
267b Another waveguide
268 Eighth Y-branch waveguide
268a One waveguide
268b Another waveguide
269 Ninth Y-branch waveguide
269a One waveguide
269b Another waveguide
270 Tenth Y-branch waveguide
271 First merge waveguide
271a Waveguide
272 Second merge waveguide
272a Waveguide
273 Third merge waveguide
273a Waveguide
274 Fourth merge waveguide
274a Waveguide
275 Fifth merge waveguide
275a Waveguide
276 Sixth merge waveguide
276a Waveguide
277 Seventh merge waveguide
277a Waveguide
278 Eighth merge waveguide
278a Waveguide
279 Ninth merge waveguide
279a Waveguide
300 Reference region
301 Former stage region
302 Second former stage region
303 Latter stage region
310 Input stage region
320 Output stage region

What is claimed is:
1. An optical mode switch comprising:
a single input port arranged on a substrate, a single output port arranged on the substrate, and mode switch means arranged on the substrate between the input port and the output port and that outputs arbitrary mode light inputted from the input port, from the output port, as arbitrary mode light, wherein both the input port and the output port comprise a waveguide width which is acceptable for higher-order mode light to pass,
wherein the mode switch means comprises:
an optical branch waveguide that divides mode light inputted from the input port;
plurality of waveguides that are connected to the optical branch waveguide and juxtaposed substantially horizontally relative to the substrate;
refractive index changing means that is arranged after the optical branch waveguide and changes a refractive index of a core of a waveguide; and
an optical multiplexing waveguide that is arranged after the refractive index changing means and couples the mode light divided by the optical branch waveguide to output the coupled mode light from the output port, wherein the arbitrary mode light inputted from the input port is outputted from the output port as arbitrary mode light in accordance with the refractive index changed by the refractive index changing means.

2. The optical mode switch according to claim 1, wherein the refractive index changing means comprises a pair of electrodes that are arranged in opposite positions across the core of the waveguide.

3. The optical mode switch according to claim 1, further comprising:

a first clad layer that is laminated onto the substrate;

a semiconductor layer that is laminated onto the first clad layer and includes an intrinsic semiconductor region having a refractive index higher than the refractive index of the first clad layer; and a second semiconductor layer that is laminated onto the semiconductor layer and has a refractive index lower than the refractive index of the semiconductor layer, wherein the refractive index changing means comprises a refractive index changing region in which a p-type semiconductor region and an n-type semiconductor region, which are formed by doping an impurity to the intrinsic semiconductor region of the semiconductor layer, are juxtaposed in a waveguiding direction along with the intrinsic semiconductor region to constitute a pin junction.

4. The optical mode switch according to claim 1, wherein:

the mode switch means comprises two waveguides that are juxtaposed between the input port and the output port;

the optical branch waveguide comprises a Y-branch waveguide that is arranged between the input port and the two waveguides;

the optical multiplexing waveguide comprises a merge waveguide that is arranged between the output port and the two waveguides; and the refractive index changing means is arranged in at least one of the two waveguides or in a merging waveguide of the merge waveguide.

5. The optical mode switch according to claim 4, wherein:

the two waveguides juxtaposed between the input port and the output port comprises linear waveguides;

the Y-branch waveguide has a planar shape in which two branched waveguides are asymmetric and have different waveguide widths;

the merge waveguide has a planar shape in which two merging waveguides are symmetric; and the refractive index changing means is arranged in the two merging waveguides of the merge waveguide.

6. The optical mode switch according to claim 4, wherein:

the two waveguides juxtaposed between the input port and the output port comprises linear waveguides;

the Y-branch waveguide has a planar shape in which two branched waveguides are symmetric;

the merge waveguide has a planar shape in which two merging waveguides are symmetric; and the refractive index changing means is arranged in at least one of the two waveguides juxtaposed between the input port and the output port.

7. The optical mode switch according to claim 1, wherein:

the mode switch means comprises two waveguides that are juxtaposed between the input port and the output port;

the optical branch waveguide comprises a 1×2 type multi-mode interference waveguide that is arranged between the input port and the two waveguides;

the optical multiplexing waveguide comprises a 2×1 type multi-mode interference waveguide that is arranged between the output port and the two waveguides; and the refractive index changing means is arranged in at least one of the two waveguides juxtaposed between the input port and the output port.

8. The optical mode switch according to claim 1, wherein:

the mode switch means comprises two waveguides that are juxtaposed between the input port and the output port;

the optical branch waveguide comprises a 1×2 type multi-mode interference waveguide that is arranged between the input port and the two waveguides;

the optical multiplexing waveguide comprises a merge waveguide that is arranged between the output port and the two waveguides; and the refractive index changing means is arranged in at least one of the two waveguides or in a merging waveguide of the merge waveguide.

9. An optical mode switch comprising a single input port, a single output port, and mode switch means arranged between the input port and the output port and that outputs arbitrary mode light inputted from the input port, from the output port, as arbitrary mode light, wherein:

$2^n$ kinds of mode light comprising zero-order mode light to $2^n-1$-order mode light (n being an integer of 2 or more) are used;

the mode switch means comprises:

an input stage region that is connected to the input port and in which one or more Y-branch waveguides for dividing mode light into two are arranged;

an output stage region that is connected to the output port and in which one or more merge waveguides for coupling two mode light are arranged;

a reference region that is arranged between the input stage region and the output stage region and in which $2^n$ waveguides for propagating zero-order mode light are juxtaposed;

a former stage region that is arranged in a former stage of the reference region and in which two waveguides, connected to two outermost waveguides in the reference region respectively, and $2^{n-1}-1$ waveguides, connected to $2^{n-1}-1$ Y-branch waveguides that each divides into two adjacent waveguides except for the two outermost waveguides in the reference region, are juxtaposed;

a second former stage region that is arranged in a former stage of the former stage region and in which $2^n-1$ waveguides are juxtaposed, via $2^{n-1}-1$ merge waveguides to be coupled with $2^{n-1}-1$ waveguides in the former stage region, and $2^{n-1}$ Y-branch waveguides that divide into $2^n$ adjacent waveguides among $2^n-2$ waveguides before coupling of the $2^{n-1}-1$ merge waveguides and two waveguides to be connected to two outermost waveguides in the former stage region respectively;

a latter stage region that is arranged in a latter stage of the reference region and in which $2^{n-1}$ waveguides to be connected to $2^{n-1}$ merge waveguides that couple two adjacent waveguides in the reference region, are juxtaposed; and the refractive index changing means that is arranged in $2^n-1$ waveguides except for one outermost waveguide in the reference region, $2^{n-1}-1$ waveguides except for two outermost waveguides in the former stage region, $2^{n-1}-1$ waveguides except for one outermost waveguide in the second former stage region, which does not make one outermost waveguide excluded in the reference region a route, and $2^{n-1}-1$ waveguides except for one outermost waveguide in the latter stage region, which does not make one outermost waveguide excluded in the reference region a route, and that changes the refractive index thereof; and the arbitrary mode light inputted from the input port is outputted from the output port as arbitrary mode light in accordance with the refractive index changed by the refractive index changing means.

10. The optical mode switch according to claim 9, wherein:

four kinds of mode light comprising zero-order mode light to third-order mode light are used;
the mode switch means comprises:
a first Y-branch waveguide that divides mode light incident from the input port into two;
a second Y-branch waveguide that divides mode light propagating through one branched waveguide of the first Y-branch waveguide into two;
a third Y-branch waveguide that divides mode light propagating through another branched waveguide of the first Y-branch waveguide into two;
a first merge waveguide that couples mode light propagating through one branched waveguide of the second Y-branch waveguide and mode light propagating through one branched waveguide of the third Y-branch waveguide;
a fourth Y-branch waveguide that divides mode light incident from the first merge waveguide;
a second merge waveguide that couples mode light propagating through another branched waveguide of the second Y-branch waveguide and mode light propagating through one branched waveguide of the fourth Y-branch waveguide;
a third merge waveguide that couples mode light propagating through another branched waveguide of the third Y-branch waveguide and mode light propagating through another branched waveguide of the fourth Y-branch waveguide; and
a fourth merge waveguide that couples mode light incident from the second merge waveguide and mode light incident from the third merge waveguide to output the coupled mode light from the output port; and
the refractive index changing means is arranged in another branched waveguide of the first Y-branch waveguide, a waveguide between the first merge waveguide and the fourth Y-branch waveguide, one branched waveguide and another branched waveguide of the fourth Y-branch waveguide, another branched waveguide of the third Y-branch waveguide, and waveguide between the third merge waveguide and the fourth merge waveguide.

11. The optical mode switch according to claim 9, wherein:

eight kinds of mode light comprising zero-order mode light to seventh-order mode light are used;
the mode switch means comprises:
a first Y-branch waveguide that divides mode light incident from the input port into two;
a second Y-branch waveguide that divides mode light propagating through one branched waveguide of the first Y-branch waveguide into two;
a third Y-branch waveguide that divides mode light propagating through another branched waveguide of the first Y-branch waveguide into two;
a fourth Y-branch waveguide that divides mode light propagating through one branched waveguide of the second Y-branch waveguide into two;
a fifth Y-branch waveguide that divides mode light propagating through another branched waveguide of the second Y-branch waveguide into two;
a sixth Y-branch waveguide that divides mode light propagating through one branched waveguide of the third Y-branch waveguide into two;
a seventh Y-branch waveguide that divides mode light propagating through another branched waveguide of the third Y-branch waveguide into two;
a first merge waveguide that couples mode light propagating through one branched waveguide of the fourth Y-branch waveguide and mode light propagating through one branched waveguide of the fifth Y-branch waveguide;
a second merge waveguide that couples mode light propagating through another branched waveguide of the fifth Y-branch waveguide and mode light propagating through one branched waveguide of the sixth Y-branch waveguide;
a third merge waveguide that couples mode light propagating through another branched waveguide of the sixth Y-branch waveguide and mode light propagating through one branched waveguide of the seventh Y-branch waveguide;
an eighth Y-branch waveguide that divides mode light incident from the first merge waveguide into two;
a ninth Y-branch waveguide that divides mode light incident from the second merge waveguide into two;
a tenth Y-branch waveguide that divides mode light incident from the third merge waveguide;
a fourth merge waveguide that couples mode light propagating through another branched waveguide of the fourth Y-branch waveguide and mode light propagating through one branched waveguide of the eighth Y-branch waveguide;
a fifth merge waveguide that couples mode light propagating through another branched waveguide of the eighth Y-branch waveguide and mode light propagating through one branched waveguide of the ninth Y-branch waveguide;
a sixth merge waveguide that couples mode light propagating through another branched waveguide of the ninth Y-branch waveguide and mode light propagating through one branched waveguide of the tenth Y-branch waveguide;
a seventh merge waveguide that couples mode light propagating through another branched waveguide of the seventh Y-branch waveguide and mode light propagating through another branched waveguide of the tenth Y-branch waveguide;
an eighth merge waveguide that couples mode light incident from the fourth merge waveguide and mode light incident from the fifth merge waveguide;
a ninth merge waveguide that couples mode light incident from the sixth merge waveguide and mode light incident from the seventh merge waveguide; and
a tenth merge waveguide that couples mode light incident from the eighth merge waveguide and mode light incident from the ninth merge waveguide to output the coupled mode light from the output port; and the refractive index changing means is arranged in another branched waveguide of the second Y-branch waveguide, one branched waveguide and another branched waveguide of the third Y-branch waveguide, a waveguide between the first merge waveguide and the eighth Y-branch waveguide, a waveguide between the second merge waveguide and the ninth Y-branch waveguide, a waveguide between the third merge waveguide and the tenth Y-branch waveguide, one branched waveguide and another branched waveguide of the eighth Y-branch waveguide, one branched waveguide and another branched waveguide of the ninth Y-branch waveguide, one branched waveguide and another branched waveguide of the tenth Y-branch waveguide, another branched waveguide of the seventh Y-branch waveguide, a waveguide between the fifth merge waveguide and the eighth merge waveguide, a waveguide between the sixth merge waveguide and the ninth merge waveguide, and a waveguide between the seventh merge waveguide and the ninth merge waveguide.

12. An optical mode switch comprising:

a single input port arranged on a substrate, a single output port arranged on the substrate, and mode switch means arranged on the substrate between the input port and the output port and that outputs arbitrary mode light inputted from the input port, from the output port, as arbitrary mode light, wherein the mode switch means comprises:

an optical branch waveguide that divides mode light inputted from the input port;

plurality of waveguides that are connected to the optical branch waveguide and juxtaposed substantially horizontally relative to the substrate;

refractive index changing means that is arranged after the optical branch waveguide and changes a refractive index of a core of a waveguide; and an optical multiplexing waveguide that is arranged after the refractive index changing means and couples the mode light divided by the optical branch waveguide to output the coupled mode light from the output port, wherein the arbitrary mode light inputted from the input port is outputted from the output port as arbitrary mode light in accordance with the refractive index changed by the refractive index changing means, and further comprising:

a first clad layer that is laminated onto the substrate;

a semiconductor layer that is laminated onto the first clad layer and includes an intrinsic semiconductor region having a refractive index higher than the refractive index of the first clad layer; and a second semiconductor layer that is laminated onto the semiconductor layer and has a refractive index lower than the refractive index of the semiconductor layer, wherein the refractive index changing means comprises a refractive index changing region in which a p-type semiconductor region and an n-type semiconductor region, which are formed by doping an impurity to the intrinsic semiconductor region of the semiconductor layer, are juxtaposed in a waveguiding direction along with the intrinsic semiconductor region to constitute a pin junction.

* * * * *